US006810903B1

(12) United States Patent
Murphy et al.

(10) Patent No.: US 6,810,903 B1
(45) Date of Patent: Nov. 2, 2004

(54) CONDUIT FLOW CONTROLLER

(75) Inventors: Kevin P. Murphy, Oak Brook; Michael Murphy, Blue Island; Garland Y. Smith, Hinsdale, all of IL (US)

(73) Assignee: Hydra-Stop, Inc., Alsip, IL (US)

( * ) Notice: Subject to any disclaimer, the term of this patent is extended or adjusted under 35 U.S.C. 154(b) by 0 days.

(21) Appl. No.: 09/296,119

(22) Filed: Apr. 21, 1999

Related U.S. Application Data

(60) Provisional application No. 60/082,644, filed on Apr. 22, 1998.

(51) Int. Cl.[7] ............................ F16K 43/00; F16K 7/20; F16L 55/132
(52) U.S. Cl. ................. 137/318; 29/213.1; 137/315.41; 137/319; 138/89; 138/94; 138/97; 251/267; 251/326
(58) Field of Search .................... 137/15.14, 315.01, 137/317, 318, 315.41, 15.15, 319; 138/89, 94, 97; 29/213.1; 251/326, 327, 267

(56) References Cited

U.S. PATENT DOCUMENTS

| | | | | |
|---|---|---|---|---|
| 1,885,896 A | * | 11/1932 | Carr et al. .................... | 138/94 |
| 2,272,734 A | * | 2/1942 | Witt ............................ | 138/94 |
| 2,285,392 A | * | 6/1942 | Cline .......................... | 138/94 |
| 2,285,393 A | * | 6/1942 | Cline .......................... | 138/94 |
| 2,285,779 A | * | 6/1942 | Mueller et al. ................ | 138/94 |
| 2,425,483 A | * | 8/1947 | Mueller et al. ................ | 138/94 |
| 2,482,696 A | * | 9/1949 | Smith et al. ................... | 138/94 |
| RE23,526 E | * | 7/1952 | Preston et al. ................. | 138/94 |
| 2,771,096 A | * | 11/1956 | Ver Nooy ..................... | 138/89 |
| 2,780,244 A | * | 2/1957 | Lee ............................. | 138/94 |
| 2,988,111 A | * | 6/1961 | Ver Nooy ..................... | 138/89 |
| 3,115,163 A | * | 12/1963 | Van Epps et al. ............. | 138/94 |
| 3,120,246 A | * | 2/1964 | Alter ........................... | 138/94 |
| 3,217,735 A | * | 11/1965 | Stalter ......................... | 251/266 |
| 3,380,710 A | * | 4/1968 | Pletcher et al. ............. | 251/266 |
| 3,420,499 A | * | 1/1969 | Pletcher ....................... | 251/266 |
| 3,662,778 A | * | 5/1972 | Leopold, Jr. et al. ........ | 251/267 |
| 3,766,947 A | * | 10/1973 | Osburn ......................... | 138/89 |
| 3,799,182 A | * | 3/1974 | Long ........................... | 137/318 |
| 3,872,880 A | * | 3/1975 | Ver Nooy et al. ........... | 137/317 |
| 3,991,791 A | * | 11/1976 | Luckenbill .................... | 138/94 |
| 4,344,460 A | * | 8/1982 | Galos .......................... | 138/94 |
| 4,369,813 A | * | 1/1983 | Thomas ....................... | 138/94 |
| 4,532,957 A | * | 8/1985 | Battle et al. ................. | 137/375 |
| 4,592,534 A | * | 6/1986 | Ueda et al. .................. | 251/266 |
| 5,074,526 A | * | 12/1991 | Ragsdale et al. ........... | 137/318 |
| 5,186,199 A | * | 2/1993 | Murphy et al. .............. | 138/94 |
| 5,279,320 A | * | 1/1994 | Freudendahl ................ | 251/267 |
| 5,443,095 A | * | 8/1995 | Glossop, Jr. ................. | 138/94 |
| 5,470,046 A | * | 11/1995 | Mack et al. ................. | 251/329 |
| 5,676,171 A | * | 10/1997 | Heed et al. .................. | 138/94 |
| 5,690,139 A | * | 11/1997 | Murphy et al. ............. | 137/317 |

* cited by examiner

*Primary Examiner*—George L. Walton
(74) *Attorney, Agent, or Firm*—Anthony S. Zummer

(57) ABSTRACT

The invention is an improved conduit flow controller for selectively controlling the flow of fluid through an elongated conduit. The conduit has an aperture defined by a continuous peripheral edge in the sidewall of the conduit. An elongated housing surrounds the aperture and is sealingly connected to the conduit. A conduit stopper is movably mounted in the housing and is positionable in the conduit. The conduit stopper includes a deformable sealing element having opposed flat sides and an edge engageable with the conduit. A carrier is sealingly connected with the sealing element. A resilient seal is mounted on a carrier and is engageable with the continuous edge. The sealing element is cooperative with the seal to close a portion of the conduit to regulate the flow of fluid along the elongated conduit.

6 Claims, 28 Drawing Sheets

CONDUIT FLOW CONTROLLER

CROSS REFERENCE TO RELATED APPLICATION

This application is a continuation-in-part of provisional application Ser. No. 60/082,644, filed Apr. 22, 1998, titled, "Conduit Flow Controller."

BACKGROUND OF THE INVENTION

1. Field of the Invention

This invention relates to an improved conduit stopper, used in pressurized conduit. The stopper is comprised of a solid, rigid carrier with two bendable forks that contain a deformable, flat sealing element. The external cylindrical surface of each fork is covered with a resilient sleeve member. The sealing element and resilient member cooperate in effecting sealing engagement with each other and with the interior surfaces of the conduit and with the cylindrical surface of the periphery of an access port that was cut into the conduit during a previous pressure tapping procedure. This improved conduit stopper design can be used in both temporary and permanent stopper installations, which is not true of any prior art device.

2. Description of the Prior Art

Pressurized conduit or piping systems convey fluids, both liquid and gas, in municipalities, industrial plants, and commercial installations. When originally installed, these conduit systems included certain block valves that could be closed to isolate sections of the conduit for repairs, relocation, or installation of new components into the conduit.

When such shutdowns are required in municipal distribution systems, it is frequently determined that too large an area will be deprived of water or gas service. Schools, hospitals, food processors, and commercial and industrial facilities may have to be shut down.

The total length of conduit to be depressurized can be greatly shortened by using one or more conduit stoppers, often in conjunction with existing block valves. A conduit stopper is a device that can be inserted into a pressurized conduit without prior service interruption, and the volume of fluids to be wasted is greatly reduced. Upon completion of work on the depressurized conduit, the stoppers are retracted from the conduit and block valves are opened, restoring flow through the repaired section of conduit.

Conduit stoppers are very well known in prior art under a variety of names, such as line stop, conduit stopper, conduitline plugger, inserting valve, add-on valve, insertable stopper valve, etc. Regardless of variation in construction, all conduit stoppers share one primary feature: the stopper is installed into a chamber adjacent to and communicating with the pressurized conduit. In most cases the chamber is a cylindrical nozzle that is assembled perpendicular and pressure-tight to the outside of the conduit. Communication is established by a process called pressure tapping. This process is well known in prior art, and utilizes a temporary tapping valve to allow different machines and apparatus to be mounted onto the conduit without loss of fluid pressure of flow.

The conduit stopper can then be installed through the valve into the nozzle chamber, where it is held until the conduit must be plugged. To stop flow in said conduit, the stopper is then moved from the nozzle into the conduit.

Many conduit stoppers use a solid, cylindrical, deformable plug, which engages in sealing contact with the inner walls of the conduit and the nozzle and with the cylindrical cut surface of the access port in the conduit. If such a deformable plug is unsupported, as is disclosed by Long: U.S. Pat. No. 3,799,182, the upstream fluid pressure capability rating of the stopper will be low, because increased pressure will further deform the unsupported plug into a failure shape that will allow leakage past the stopper, as taught by Murphy, et al: U.S. Pat. No. 5,690,139. With some rigid internal support, as taught by Thomas: U.S. Pat. No. 4,369,813, the pressure rating of the stopper is increased.

Higher stopper pressure ratings are attainable by providing substantial upstream and downstream external supports to a central, generally flat, deformable sealing member, as taught by Witt: U.S. Pat. No. 2,272,734; Lee: U.S. Pat. No. 2,789,244; Van Epps, et al: U.S. Pat. No. 3,115,163; and Murphy, et al: U.S. Pat. No. 5,186,199. However, as above disclosed, flat, deformable members, when acting alone, cannot totally pressure seal the conduit. Leakage flow passes vertically into the communicating nozzle chamber, because the thickness of the central sealing member does not fully close the area of the access port cut by the pressure tap.

Witt: U.S. Pat. No. 2,272,734 taught bendable metal carrier forks to sealingly contact the upstream and downstream cylindrical surfaces that were cut into the upper conduit metal wall during the pressure tap. The solid geometry was incorrect, precluding tight metal-to-metal seals. Lee: U.S. Pat. No. 2,789,244 taught a thick, cylindrical extension of the flat, central seal, which extension was deformed in the intersection between the conduit and the nozzle, thereby pressure sealing said intersection and blocking all flow and upstream fluid pressure.

Van Epps, et al: U.S. Pat. No. 3,115,163 disclosed a circumferential shoulder in each fitting nozzle to seal against a resilient, segmented O ring-type seal contained on each movable, rigid, stopper carrier fork. This segmented seal of the Van Epps improvement proved to be very fragile in the field, which resulted in frequent bypass leakage around the central flat sealing element. The Murphy, et al: U.S. Pat. No. 5,186,199 improvement restricted the downward force applied onto the segmented carrier seal, thereby increasing seal life.

Use of the nozzle shoulder presents both operational and logistical problems. The vertical location of the shoulder in each nozzle is critical in order to obtain simultaneous sealing action by both the flat central sealing element and the segmented "O" ring members. Specific vertical location of the sealing shoulder in each nozzle must be determined by the exact bore and wall thickness of the specific conduit into which the stopper nozzle is to be inserted.

Within any given nominal conduit size, for instance 8-inch, there may be more than 10 combinations of wall thickness and conduit outer diameter. Outer diameter of existing conduits can be determined either from records or by inspection. However, in emergency situations wall thickness is often unknown. Nozzles with improper shoulder locations are frequently installed, resulting in excessive leakage past the stopper.

The present invention totally eliminates the sealing shoulder in the nozzles of all fittings, thereby allowing shutdown using a single nozzle size for the full range of dimensional variation found in any given nominal conduit size.

Most conduit stoppers are intended for temporary service, often in emergency situations. When work is completed on the depressurized conduit, the temporary stopper is retracted, and the apparatus and tapping valve are removed under pressure and without interruption of service. The stopper fitting on the conduit is then protected with a closure device. The process can later be repeated under full fluid pressure using the original fitting.

Other conduit stoppers, such as Thomas: U.S. Pat. No. 4,369,813 and Long: U.S. Pat. No. 3,799,182, are designed specifically for permanent installation into a pressurized conduit. Each permanent conduit stopper is provided with an internal jackscrew-type actuating means that allows the conduit stopper to be operated as a conventional block valve that is opened and closed by a worker by merely turning a handle or a valve wrench. This type of permanent stopper can be used in emergencies in the same manner as a temporary stopper and then abandoned. However, the fitting material cost is considerably higher because of the self-contained jackscrew actuators. The present invention allows a temporary conduit stopper to later be converted into a permanent embodiment under pressure and with interruption of flow. The designs of prior art temporary conduit stoppers preclude later conversion without shutdown into permanent configurations.

BRIEF DESCRIPTION OF THE DRAWINGS

FIG. 1 is an enlarged fragmentary view of the actuator assembly, which is the upper portion of the apparatus of FIG. 1;

DETAILED DESCRIPTION OF THE PREFERRED EMBODIMENT

Conduit stoppers are commonly used to block the flow of fluids through conduits. A temporary conduit stopper is commonly used in emergency situations when it is necessary to interrupt the flow through a conduit immediately for a prescribed period of time, after which the stopper is removed from the conduit. In other cases, it is found that it is desirable to provide a means to block flow through the conduit intermediately. This control is accomplished by the utilization of a permanent conduit stopper, which remains attached to the conduit and can be operated in a manner similar to a block valve that was installed in the original conduit system. In the case of both conduit stoppers, each provides a means to effect complete interruption of flow. It is also desirable to be able to utilize the same equipment for placing a permanent valve in a conduit as for providing a temporary stopper for the conduit.

Irrespective of whether there will be a permanent or temporary conduit stopper installed onto a conduit, it is necessary to make an opening in the conduit. The apparatus and method for cutting an opening in a conduit and removing the coupon is well known and understood in the art. A typical apparatus and method are disclosed in U.S. Pat. No. 3,799,182, entitled, "Add-on Stopper Valve for Existing Piping", the inventor being George M. Long.

Figure 1:
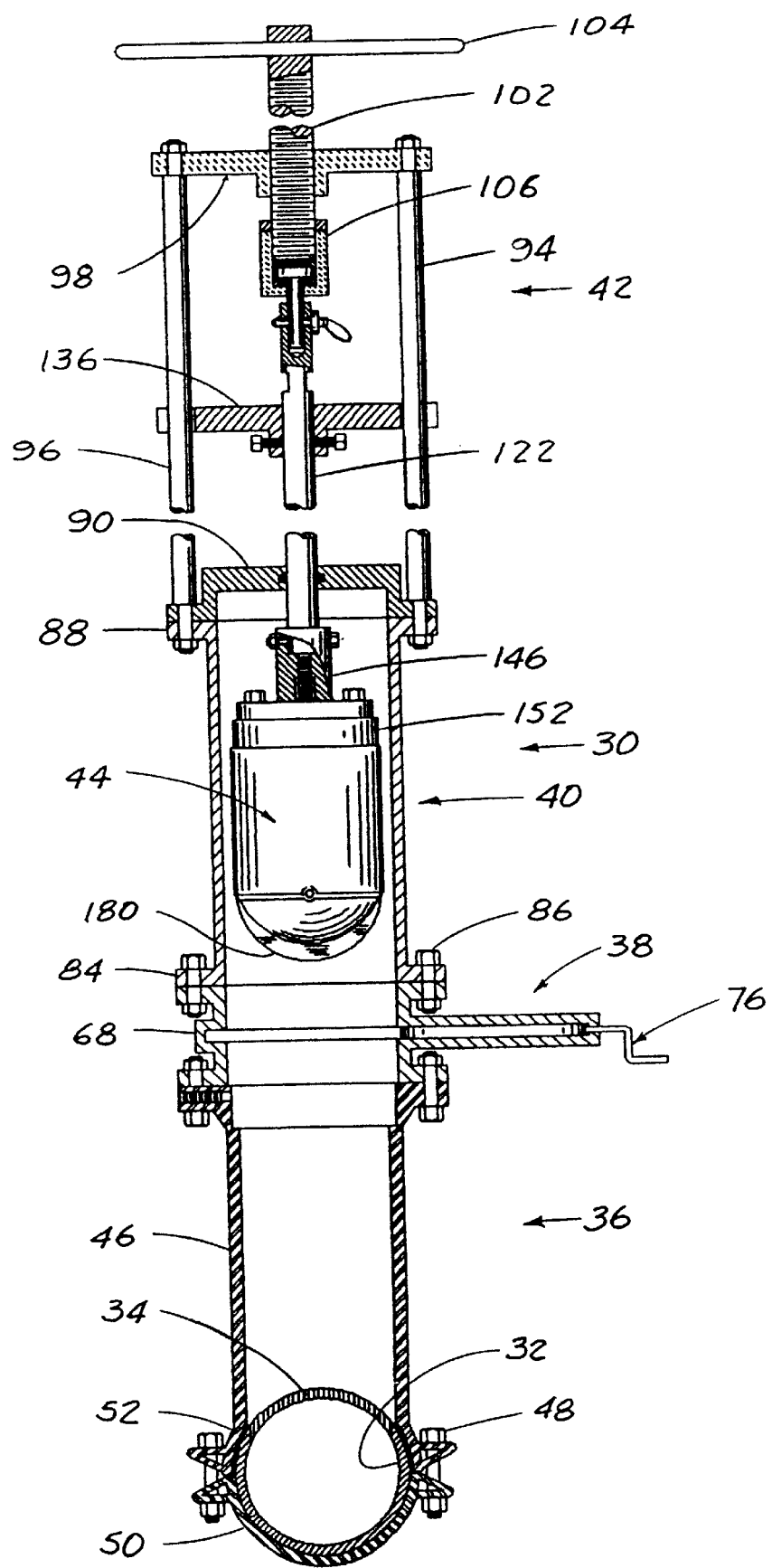
FIG. 1 is a partial cross-sectional elevational view with a cross-sectional view through a pressurized conduit with installation apparatus mounted on A temporary stopper fitting secured to the conduit.

Referring now to FIG. 1, a nozzle assembly, generally indicated by numeral 36, is sealingly mounted on a conventional pressurized elongated conduit or conduit 32 having an access port or aperture 34 formed therein. A stopper machine, generally indicated by numeral 30, is sealingly mounted on nozzle 36. A temporary tapping valve 38, part of the stopper machine, is next mounted on nozzle assembly 36. An installation housing 40 is mounted on valve 38. An actuator apparatus 42 is a conventional jackscrew in this instance, though a hydraulic cylinder may be used instead. The actuator 42 is mounted on installation housing 40. A temporary conduit stopper assembly 44 is connected to an actuator rod 122 and is shown positioned in installation housing 40.

Figure 4:
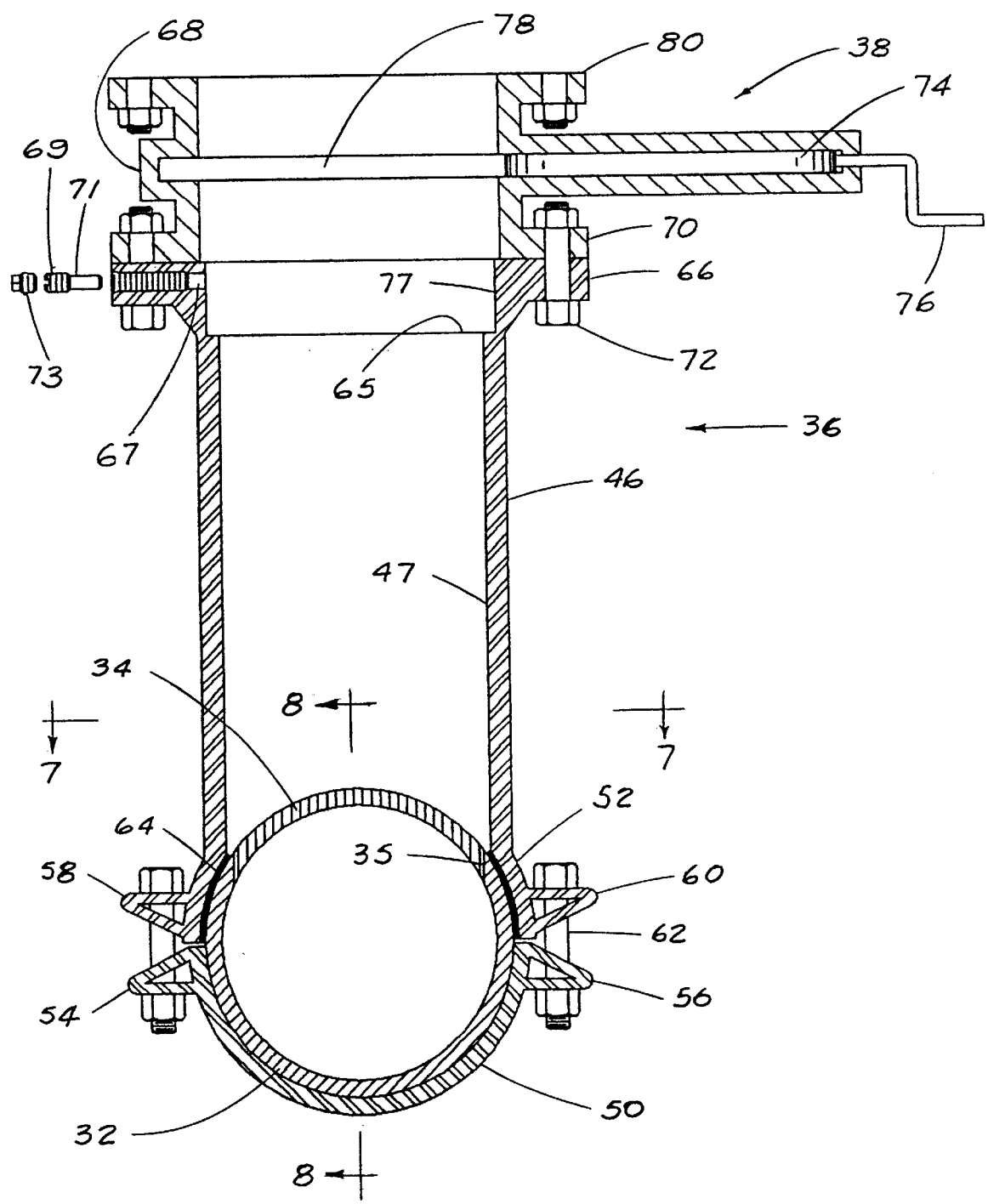
FIG. 4 is an enlarged fragmentary cross-sectional view of a flanged nozzle assembly and valve mounted on the conduit and connected to the installation housing of FIG. 3, being a portion of the apparatus shown in FIG. 1.

Nozzle assembly 36 includes an elongated housing or nozzle 46, the inner diameter of which is the same or greater than the inner diameter of conduit 32. Nozzle 46 is connected to a saddle assembly 48, as may be best seen in FIG. 4. The saddle assembly includes a lower portion 50 and an upper portion 52. The lower portion has a pair of elongated ears 54 and 56, which extend along the length of the lower portion 50 of the saddle. The upper portion 52 includes a pair of elongated ears 58 and 60, which are positioned adjacent to the ears 54 and 56, respectively. Conventional bolts and nuts 62 secure ears 54 and 56 to ears 58 and 60, respectively. A saddle gasket 64 is mounted on the conduit 32 in contact with upper portion 52 of the saddle. Gasket 64 surrounds aperture 34 to provide a leak-proof seal around the aperture. Nozzle 46 extends upward substantially perpendicular to the longitudinal axis of the conduit. The nozzle has an integral nozzle flange 66 extending outward therefrom. Flange 66 has a plurality of radial lock screw threaded openings 67, which extend radially from the exterior of the flange to the interior of the nozzle. A completion plug lock screw 69 is threadedly mounted in each of openings 67. Each lock screw has a nose 71 formed therein. A pipe plug 73 is mounted on the outer end of each of the openings 67 to seal closed the opening.

Figure 7:
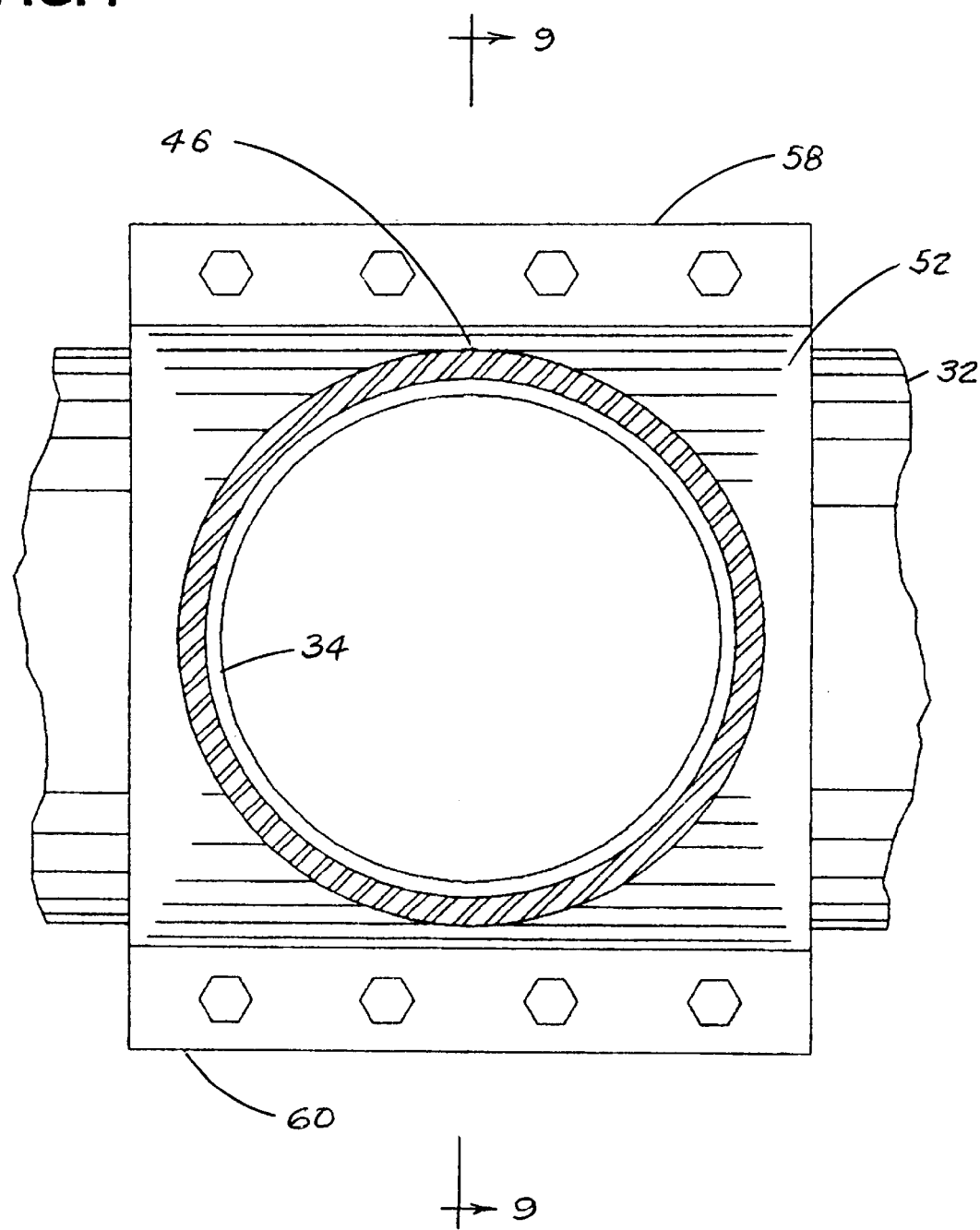
FIG. 7 is an enlarged cross-sectional view taken on Line 7—7 of FIG. 4, showing a saddle and nozzle mounted on the conduit of FIG. 1.
Figure 8:
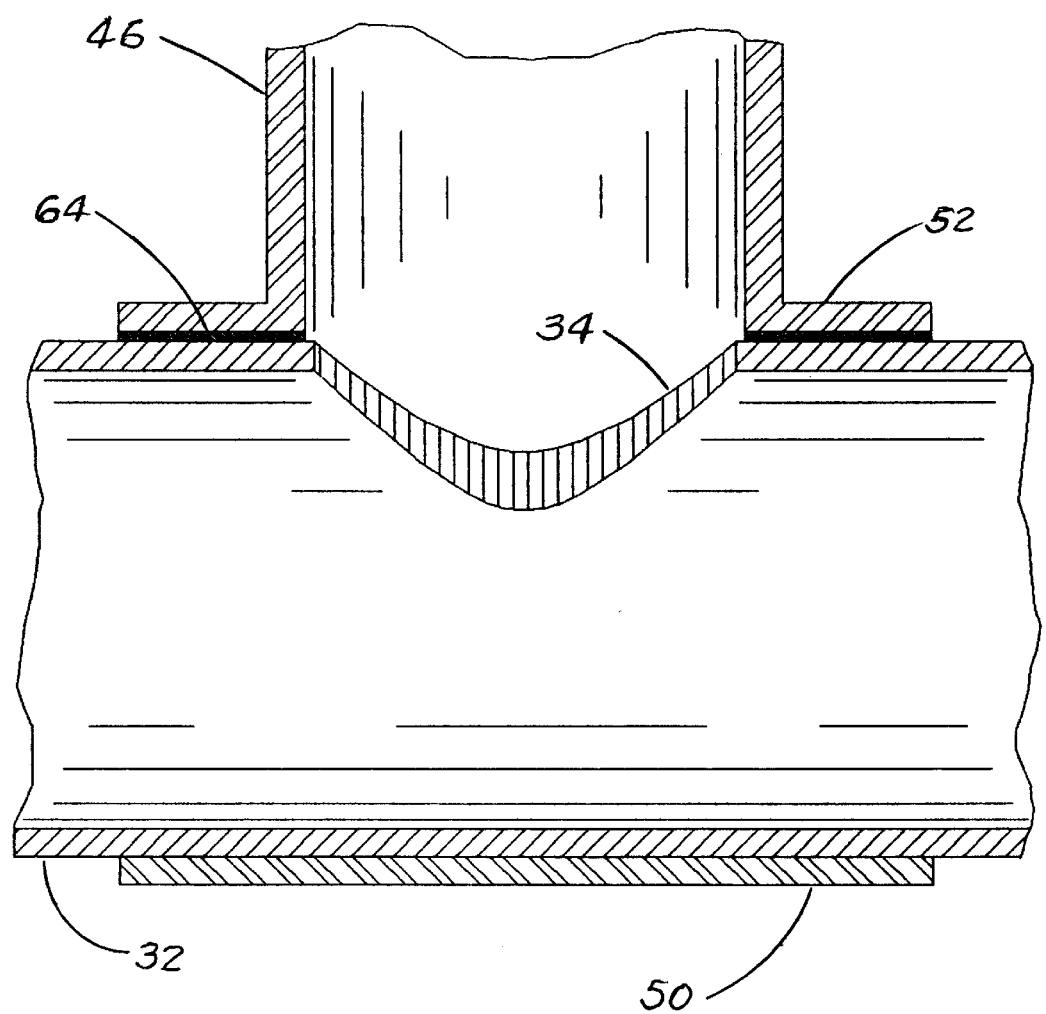
FIG. 8 is an enlarged cross-sectional view taken on Line 8–9 of FIG. 4, showing a portion of a cut in the conduit of FIG. 1 and showing the interrelationship of the saddle and nozzle.
Figure 9:
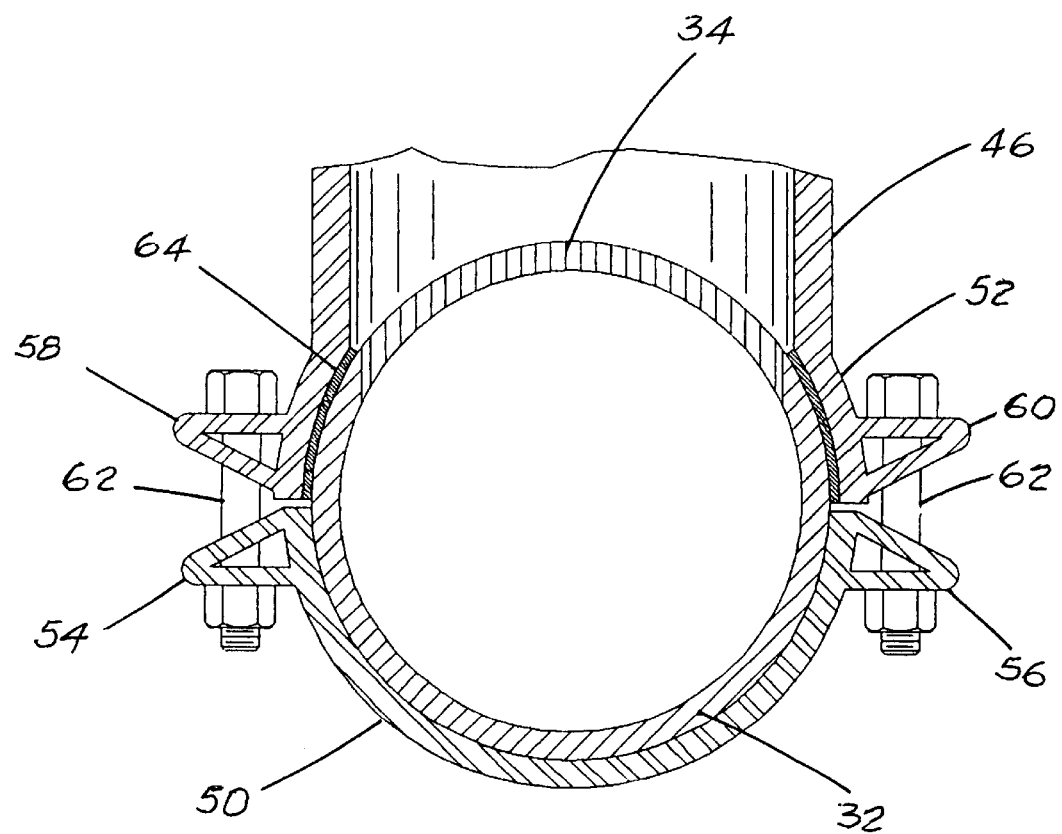
FIG. 9 is an enlarged cross-sectional view taken on Line 9—9 of FIG. 7, showing a saddle mounted on the conduit and positioning of a nozzle relative to an aperture in the conduit.
Figure 10:
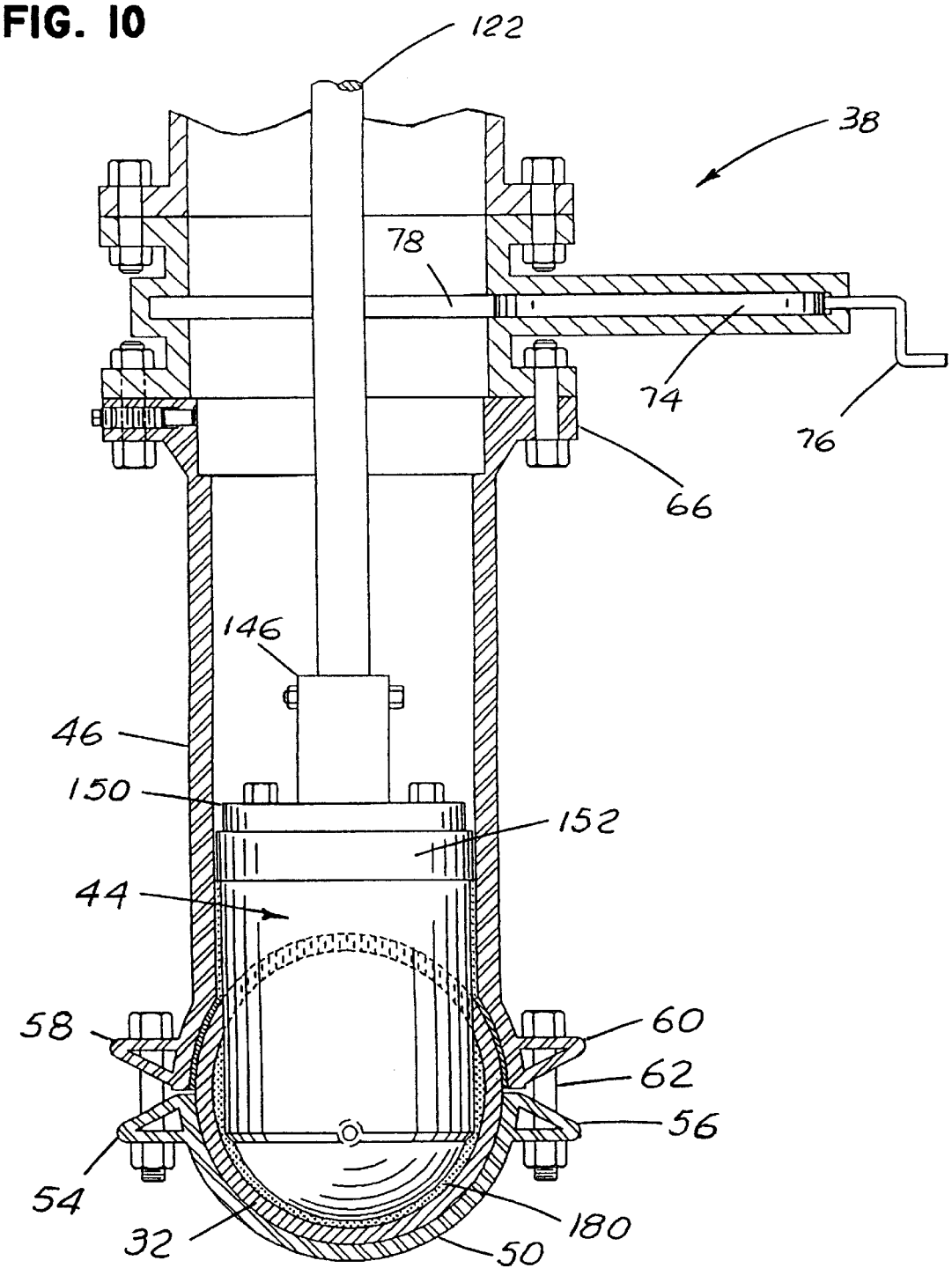
FIG. 10 is an enlarged cross-sectional view similar to FIG. 4 but showing a temporary stopper plug sealingly engaged in the conduit.

Cylindrical access port or aperture 34 is cut into the top of the conduit by a pressure tapping process, described hereinafter. The diameter of the aperture defined by a continuous edge 35 is slightly less than the inner diameter of conduit 32. Referring now to FIGS. 7, 8, and 9. It may be seen that the portion of the cut that is at the top of the conduit, as may be best seen in FIG. 9, has the least thickness of pipe exposed, while the portion of the cut made through the pipe side, close to the horizontal center of the pipe has a greater thickness of the pipe cut exposed, as shown in FIG. 8. Thus, the continuous edge portion of the pipe defining the cut, which is substantially perpendicular to the axis of the pipe, has a smaller face than that portion of the cut face that is substantially parallel to the axis of the pipe. It follows that there is a gradation in the surface area of the pipe defining the access opening from the upper portion to that portion that is adjacent to the center.

Referring back to FIG. 4, the temporary tapping valve 38 is of a conventional gate type and well known in the art. The valve includes a valve body 68 having a flange 70 formed integral therewith and sealingly secured to nozzle flange 66 by conventional nuts and bolts 72. Valve 38 includes a conventional gate 74, which is controlled through a cranked handle 76, to move inside a slot 78 in the valve body to control the flow of a fluid through the valve. The valve body 68 has an upper flange 80 formed integral therewith to connect the valve to the installation housing 40.

Figure 3:
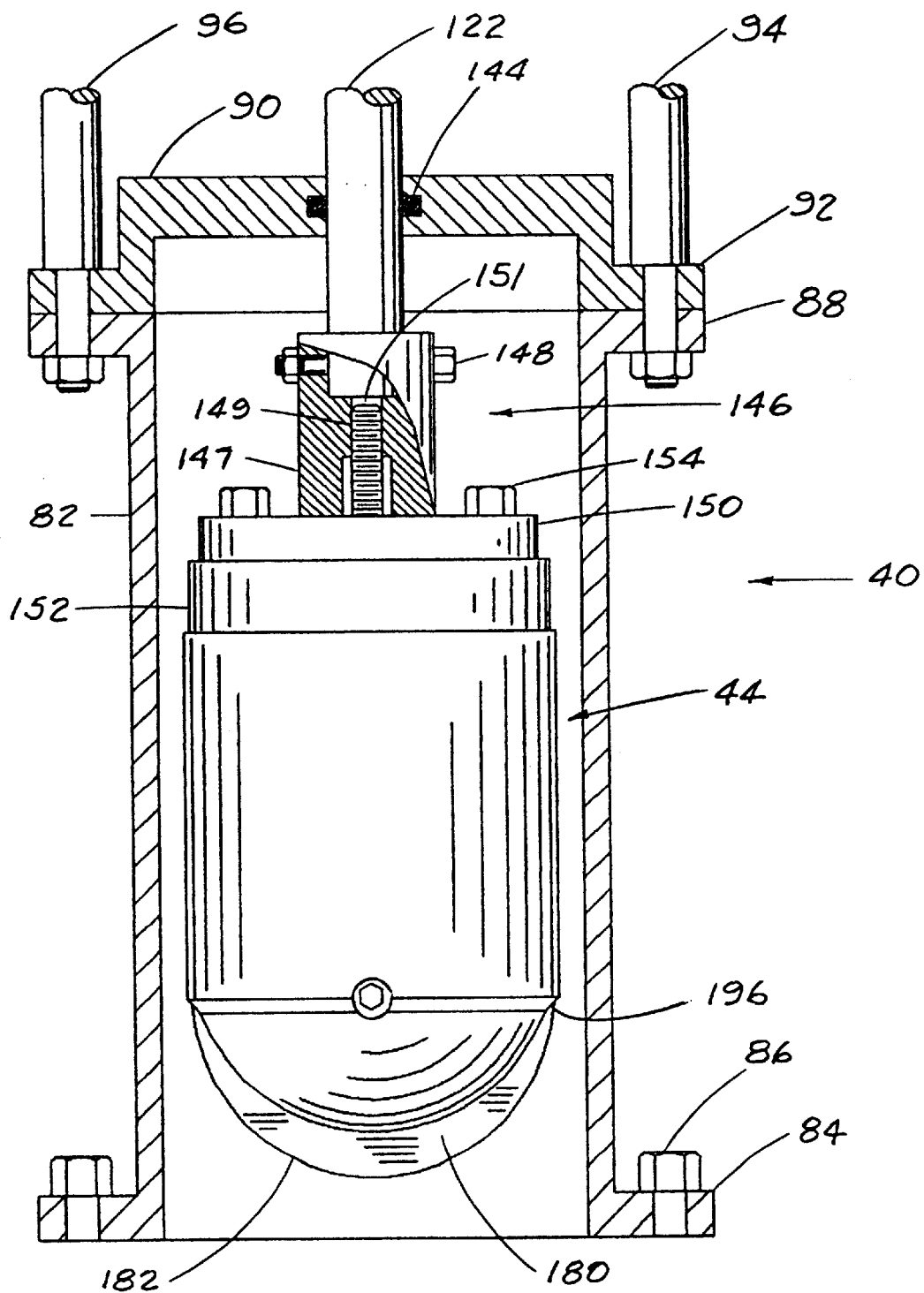
FIG. 3 is an enlarge fragmentary cross-sectional view of an installation housing connected to the actuator of FIG. 2, being part of the installation apparatus of FIG. 1.

As may be seen in FIG. 3, installation assembly 40 includes an elongated tubular cylinder 82 with a lower flange 84 formed integral therewith. Flange 84 is sealingly connected to flange 80 by a plurality of conventional nuts and bolts 86. The installation housing has an upper flange 88 formed integral with its upper end. A flanged dome 90 has a connecting flange 92, which is sealingly connected to flange 88 of the installation housing. The actuator is connected to the installation housing through a pair of tie rods 94 and 96, which also serve to secure flanges 88 and 92 in a sealing relationship.

Figure 2:
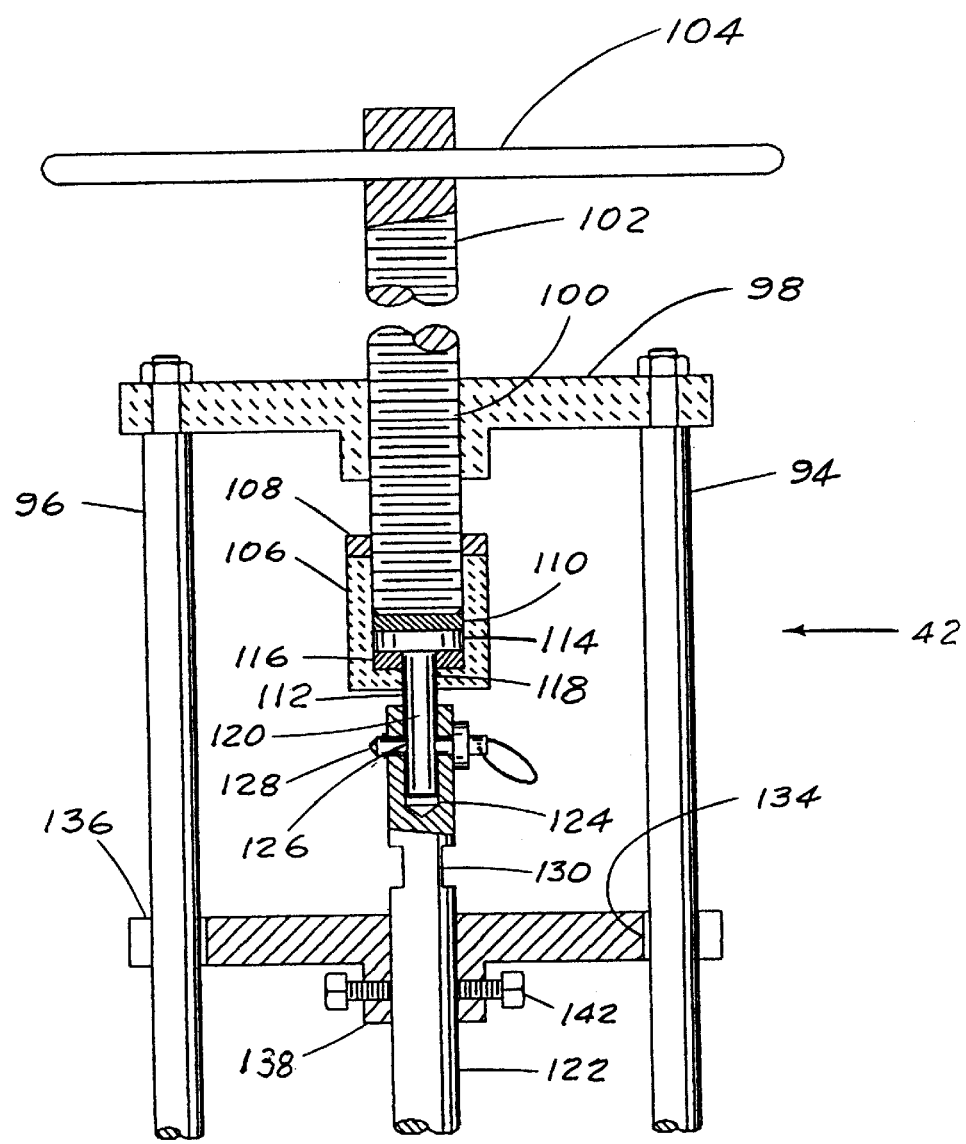

Referring now to FIG. 2, tie rods 94 and 96 are also connected to each other at their upper ends by a thrust plate 98. The thrust plate has an internally threaded aperture 100 that receives a conventional actuator screw 102 with a tee handle 104 mounted through its upper end. The actuator screw has a threaded collar 106 mounted on its lower end with a lock nut 108 locking the threaded collar to the actuator screw. A conventional thrust bearing 110 connects collar 106 with the lower end of actuator screw 102. A tee pin 112 has a head 114 in engagement with thrust bearing 110 and with a thrust washer 116. The collar 106 contains an aperture 118 through which extends a column 120 of the tee pin. Threaded collar 106 is free to rotate relative to tee pin 112. Actuator rod 122 includes a column receptacle 124, which receives column 120 of the tee pin. Column 120 contains detent aperture 126, which receives a detent pin 128 to secure the tee pin to the actuator rod 122. The actuator rod has a circular cross section, except for a pair of wrench flats 130 to provide a convenient means for rotating the actuator rod as needed.

A guide yoke 132 is secured to the actuator rod. The guide yoke has a pair of tie rod slots 134 and 136, which slidably receive tie rods 94 and 96, respectively. The yoke includes a guide hub 138. A rod aperture extends through the guide hub and receives actuator rod 122. A plurality of set screws 142 is mounted in guide hub 138 and engage the actuator rod to secure the actuator rod to the guide hub and thereby prevent the actuator rod from rotating once the set screws are tightened. As shown in FIG. 3, the actuator rod 122 extends through flanged dome 90 with a seal 144 in sealing engagement with the actuator rod. The actuator rod is connected to the plug hold assembly 146.

Nozzle assembly 36 is mounted pressure-tight onto the pipe 32. A conventional cylindrical shell cutter is advanced from a well known cutting machine (not shown here), through the open valve, to form the cylindrical access port or aperture 34. The outside diameter of the shell cutter is slightly less than the interior diameter of the conduit 32. The severed portion of pipe to form access port 34 called a coupon. The coupon is retained inside the shell cutter and is extracted through the nozzle 46 and valve 38, as is well known in the art. Gate 74 is closed and the cutting apparatus is disengaged from the valve.

The stopper assembly 44 is aligned within the installation housing 40. The guide yoke set screws 142 are tightened to prevent the actuator rod from rotating in the yoke, thereby maintaining stopper alignment with the conduit.

The installation housing 40 and actuator apparatus 42 are assembled pressure-tight onto valve 38. Valve 38 is opened, and the actuator screw is rotated clockwise to lower actuator rod 122 and stopper 44 through the valve and into nozzle 46. The stopper is then held in the nozzle until conduit shutdown is required.

Figure 5:
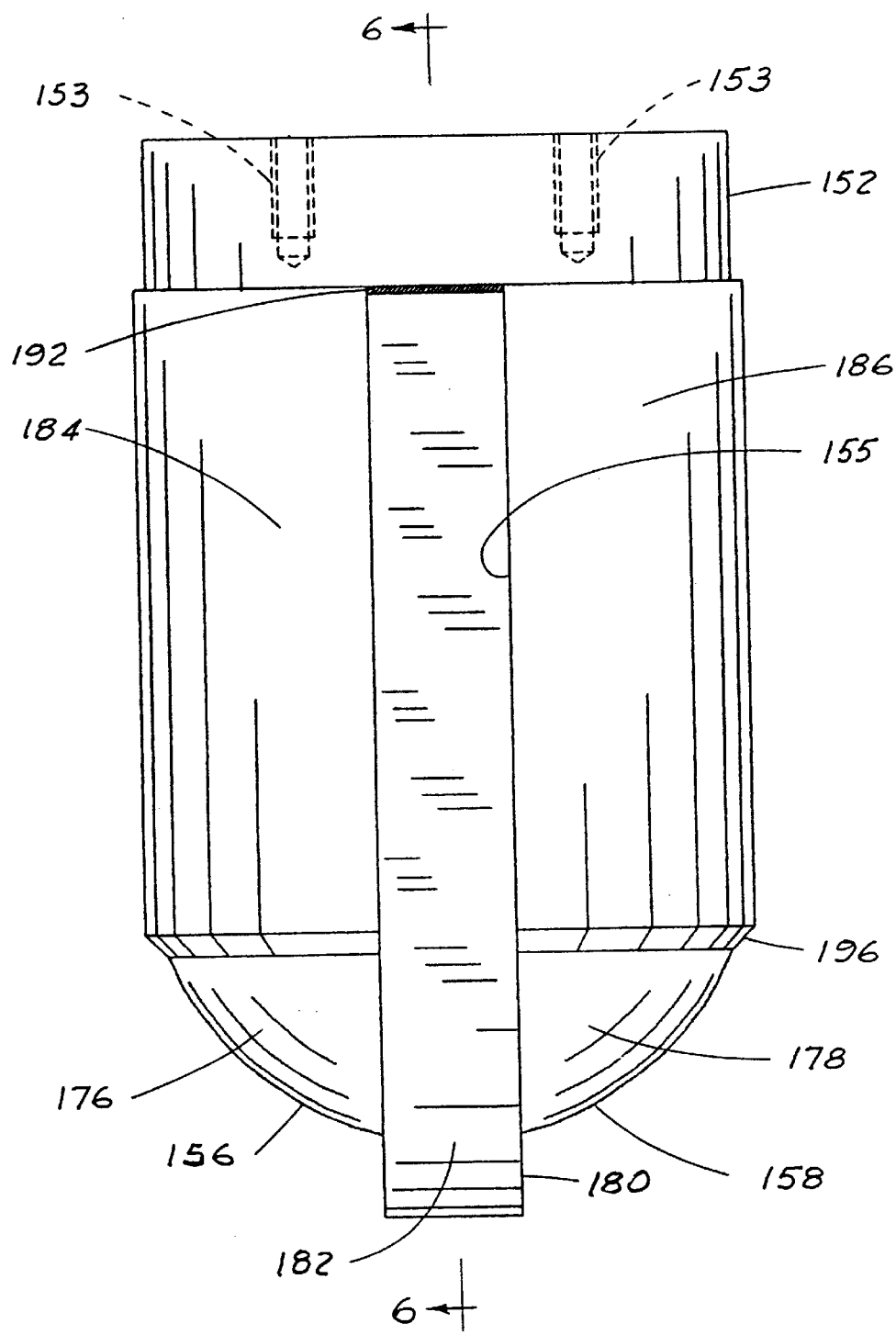
FIG. 5 is an enlarged view of a temporary stopper plug.
Figure 12:
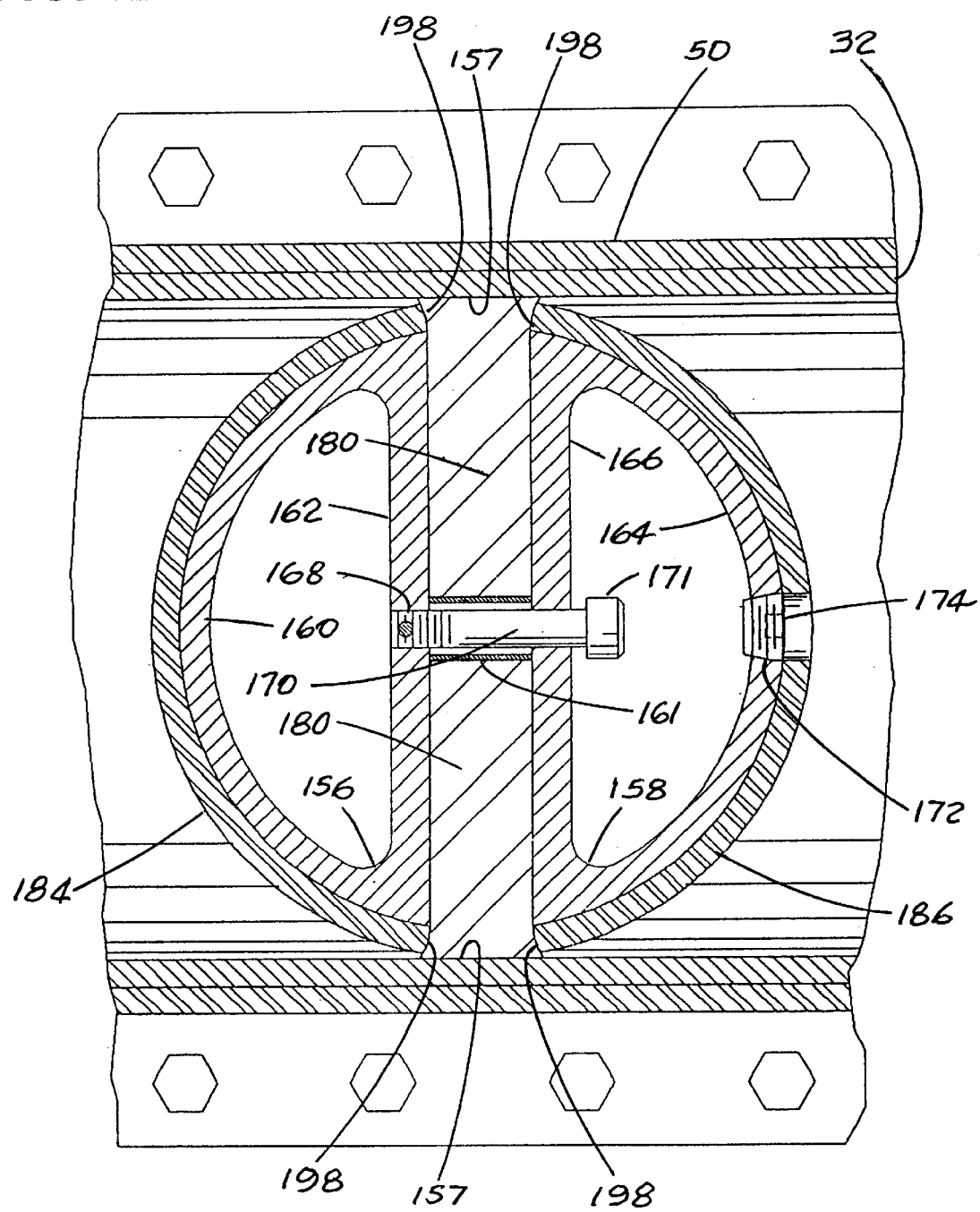
FIG. 12 is an enlarged cross-sectional view taken on Line 12—12 of FIG. 11.

Referring the FIG. 3, conduit stopper 44 is attached to a carrier holder 146, which consists of a hold hub 147 and a holder flange 150. The actuator rod 122 is secured to the hub 147 by a conventional nut and bolt 148, which prevents rotation between the rod and the holder. A vertical stud 149, integral with flange 150, threadingly engages with an internally threaded receptacle 151 in hub 147. The flange 150 is secured to a carrier which has a crown 152. A pair of conventional bolts 154 engage internally threaded openings 153 in the top of carrier crown 152. As best seen in FIGS. 5 and 12, the crown is connected to a pair of bendable arms or forks 156 and 158. Fork 156 includes an outer web 160 and an inner web 162. Fork 158 includes an outer web 164 and an inner web 166. Inner web 162 includes an internally threaded aperture 168, which receives a carrier fork bolt or arrester 170, which is rotatably mounted in inner web 166 and threadedly mounted in receptacle aperture 168 to limit the spacing between the forks. Outer web 164 contains a plug aperture 172 that allows access to bolt 170. The aperture is closed by a removable sealing plug 174. Spacer collar 161 maintains minimum distance between forks.

Figure 6:
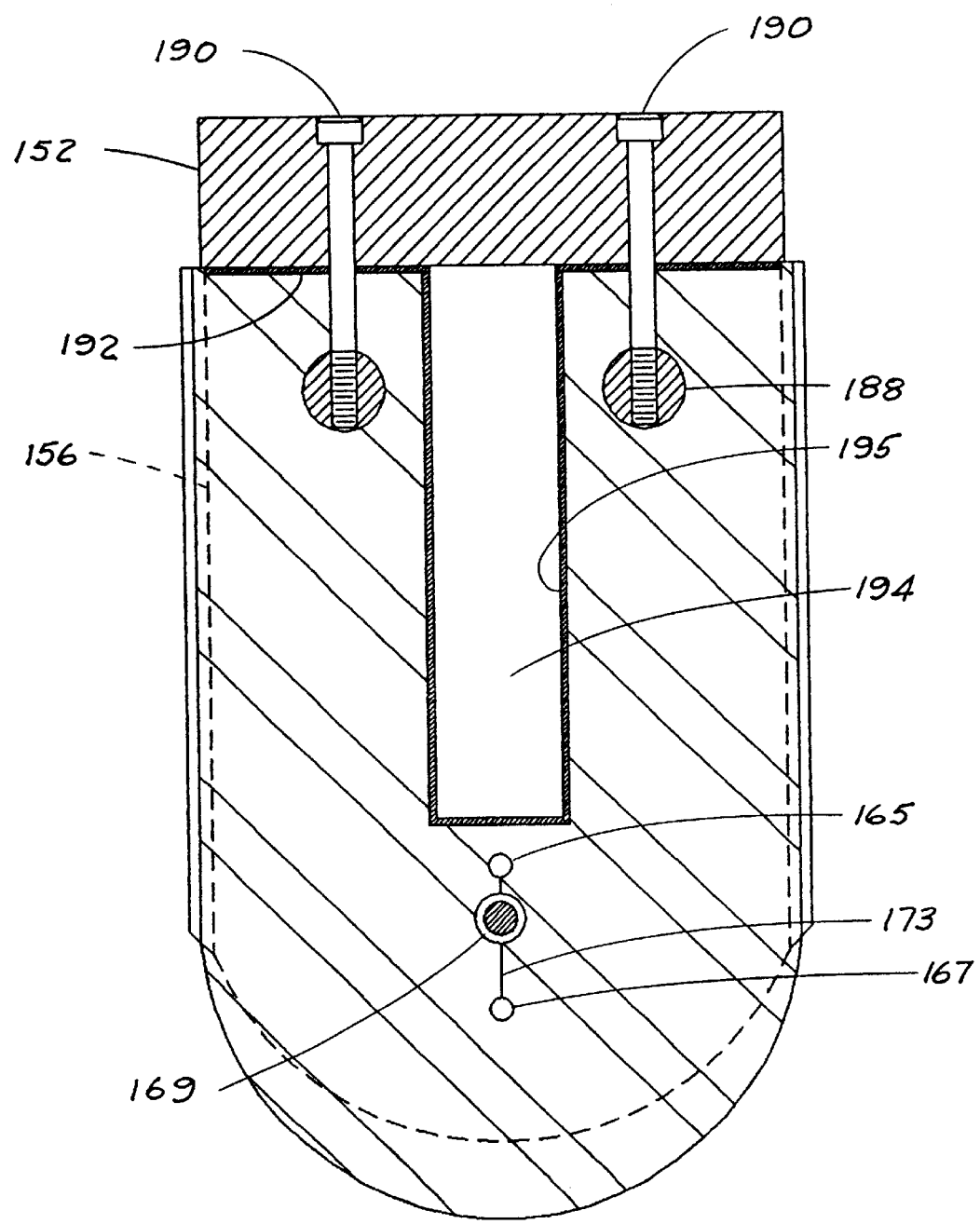
FIG. 6 is a cross-sectional view of the stopper plug taken on Line 6—6 of FIG. 5.

Referring to FIGS. 5 and 6, the forks 156 and 158 terminate in hemispherical bottoms 176 and 178, respectively. Deformable sealing element or paddle 180 is mounted between the arms 156 and 158. The element has an arcuate bottom 182 for engagement with pipe 32. A resilient sheet 184 is bonded to arm 156, and a resilient sheet 186 is bonded to arm 158. The sheets 184 and 186 provide a resilient seal for the carrier. The space between sheets 184 and 186 is filled by deformable sealing element 180. As may be seen in FIG. 6., element 180 has a pair of imbedded threaded retainer plugs 188 therein. Retainers 188 are connected to conventional bolts 190, which are mounted in crown 152. Shims 192 are selectively positioned between the crown and the paddle to allow the element to be adjusted relative to the crown. The deformable sealing element contains a recess 194 opening to the crown. The recess contains a rigid protective tube 195 to prevent inward deformation during the sealing operation. Sealing element 180 includes a vertical slit 173 that passes through the body of the element and joins an opening 169 for the fork bolt 170 and an opening 165 and 162 at each end of the slit to prevent tearing of the sealing element during sealing deformation.

Referring now to FIGS. 1 and 12, clockwise rotation of the tee handle 104 forces the plug downward through open valve 38 and nozzle assembly 36, then through access port 34, so that the stopper enters conduit 32. As the stopper enters port 34, chamfers 196 on the ends of resilient sheets 184 and 186 facilitate entry of the resilient sheets into the opening. Movement of the stopper through the opening causes sealing element 180 to engage the bottom half of the pipe. As the carrier crown 152 is moved toward the pipe and the sealing element engages the pipe, the resilience of the element causes it to spread. The sealing element expands outward and pushes arms 156 and 158 away from each other. Carrier fork bolt head 171 is spaced from inner web 166 so that the forks can bend apart. The resilient surfaces on the forks engage portions of the cut surface of the pipe. The upper portion 34 of the conduit, as may be seen in FIG. 9, has a smaller cut surface than the portion of the conduit adjacent to the pipe wall, which is near the center of the pipe, as seen in FIG. 8. The flow of fluid in the conduit pushes the stopper toward the downstream side, so that there is engagement of the resilient sheet with the cut edge of the pipe 175, as shown in FIGS. 11, 13, 14, and 15. The maximum force is at the top of the pipe, where there is the smallest amount of surface.

Figure 11:
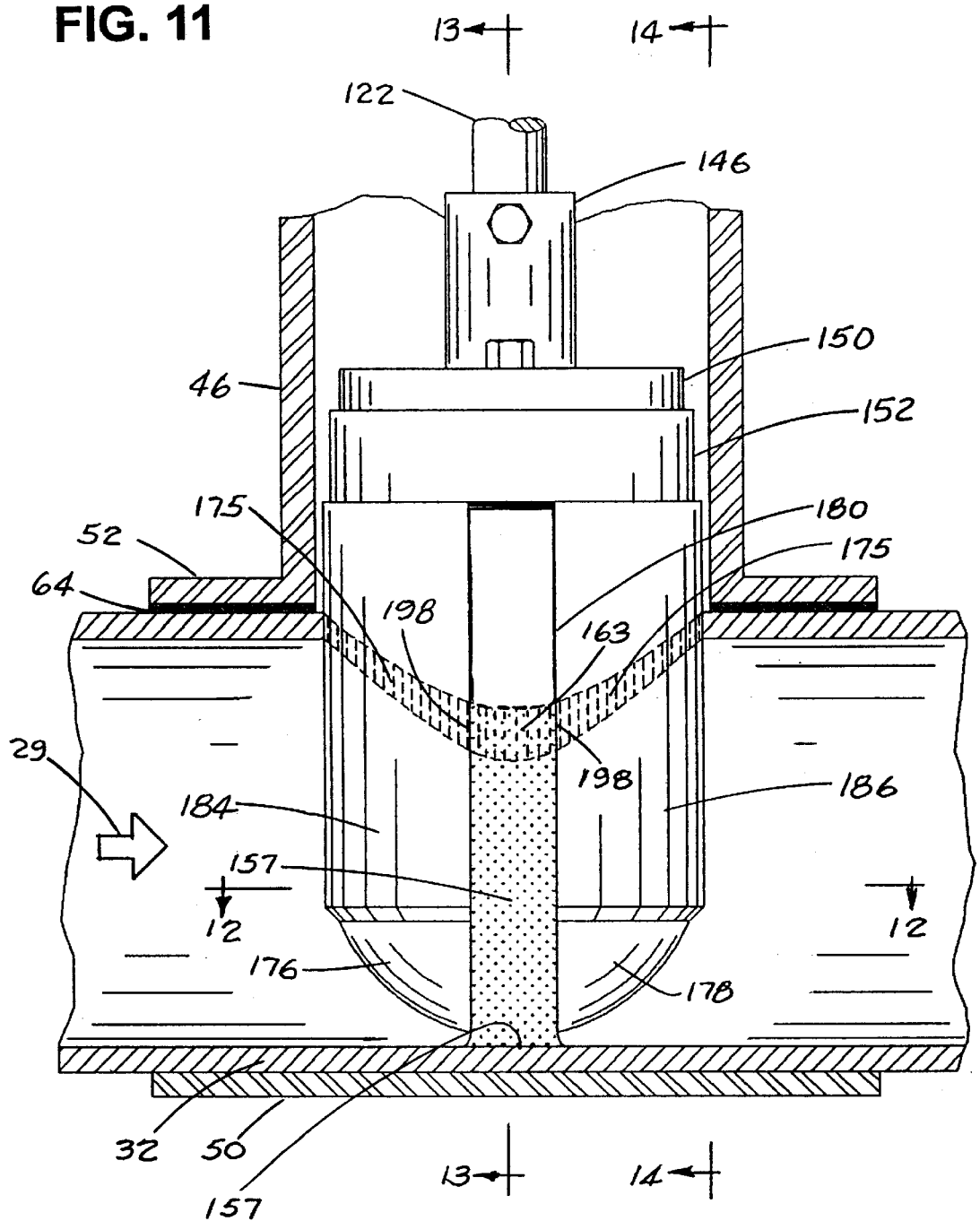
FIG. 11 is an enlarged cross-sectional view similar to FIG. 8, showing the temporary stopper plug of FIG. 10 mounted in the conduit in sealing engagement therewith to close off flow through the conduit.
Figure 15:
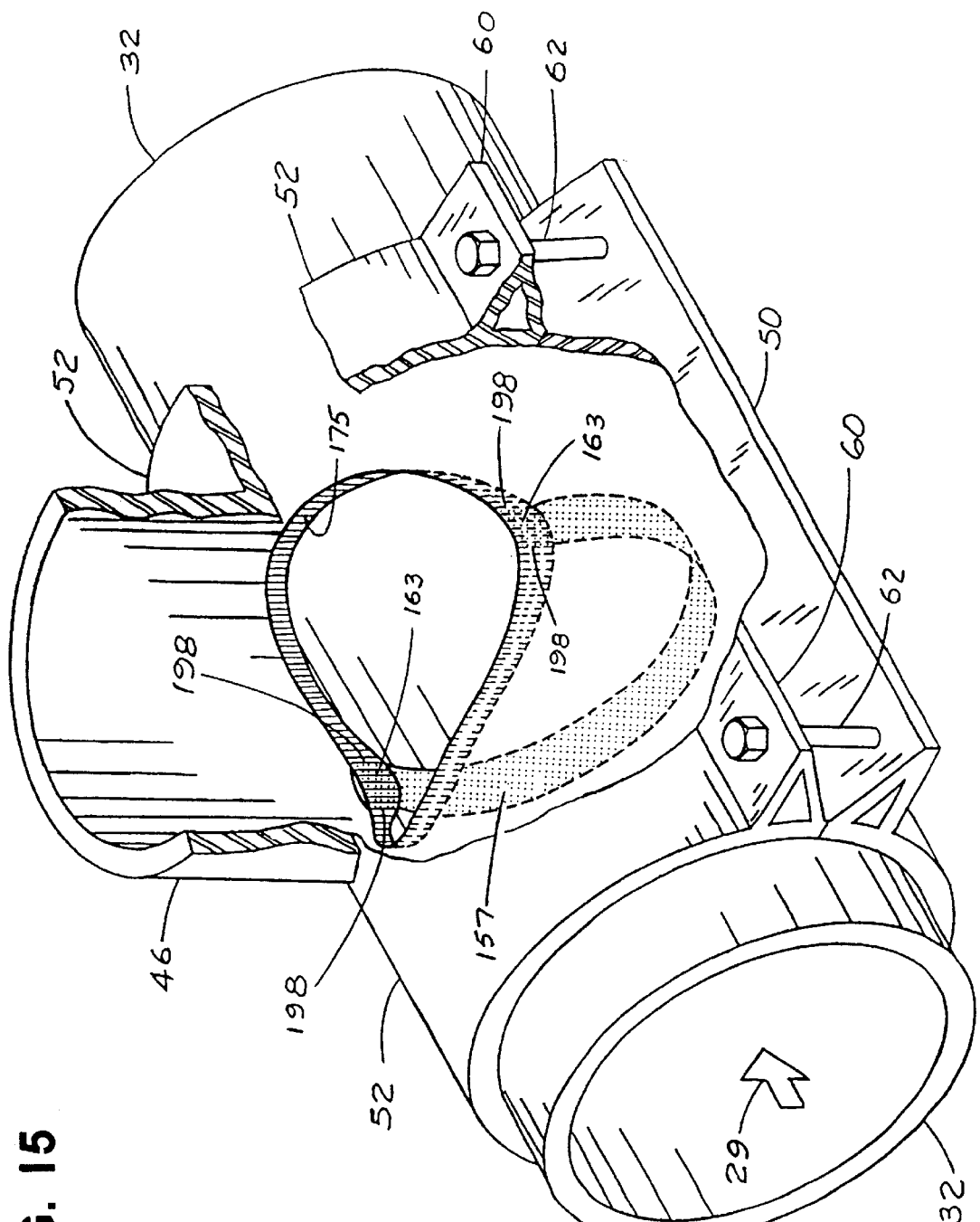
FIG. 15 is an enlarged fragmentary perspective view with portions broken away, showing areas in which the stopper members co-operate and sealingly engage the conduit.

The deformation of the sealing element provides a dual function. As the deformable sealing element 180 expands, the forks are pushed outward to force the resilient sheet on the downstream side into secure sealing engagement with the cut edge of the pipe. The element also deforms radially in the conduit to engage in a sealing relationship with the broadest portion of the cut surface 163 and engage that portion of the interior of the pipe from the broadest portion down to the bottom of the conduit and upward on a side 157. Thus, there is a seal of the downstream side of the conduit by the cooperation of the deformable sealing element and the resilient sheets, which form the resilient seal on the carrier. The flow of a fluid in the conduit is thereby regulated by the interaction of the conduit stopper 44 with the conduit to interrupt the flow of fluid. The locations of sealing interfaces 198 between the deformed sealing element and the resilient sheets are shown in FIGS. 11, 12, and 15.

Figure 13:
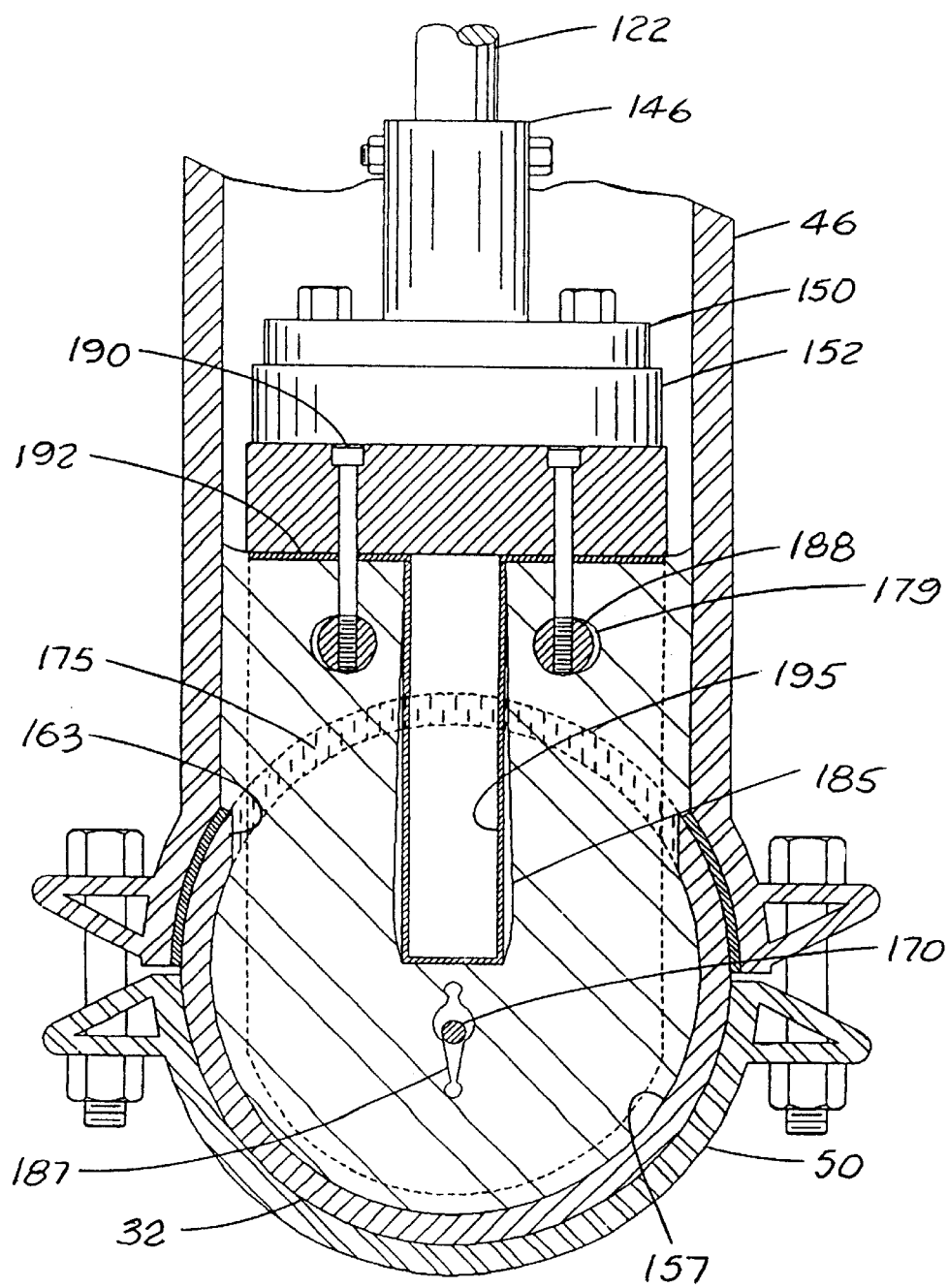
FIG. 13 is an enlarged cross-sectional view taken on Line 13—13 of FIG. 11.
Figure 14:
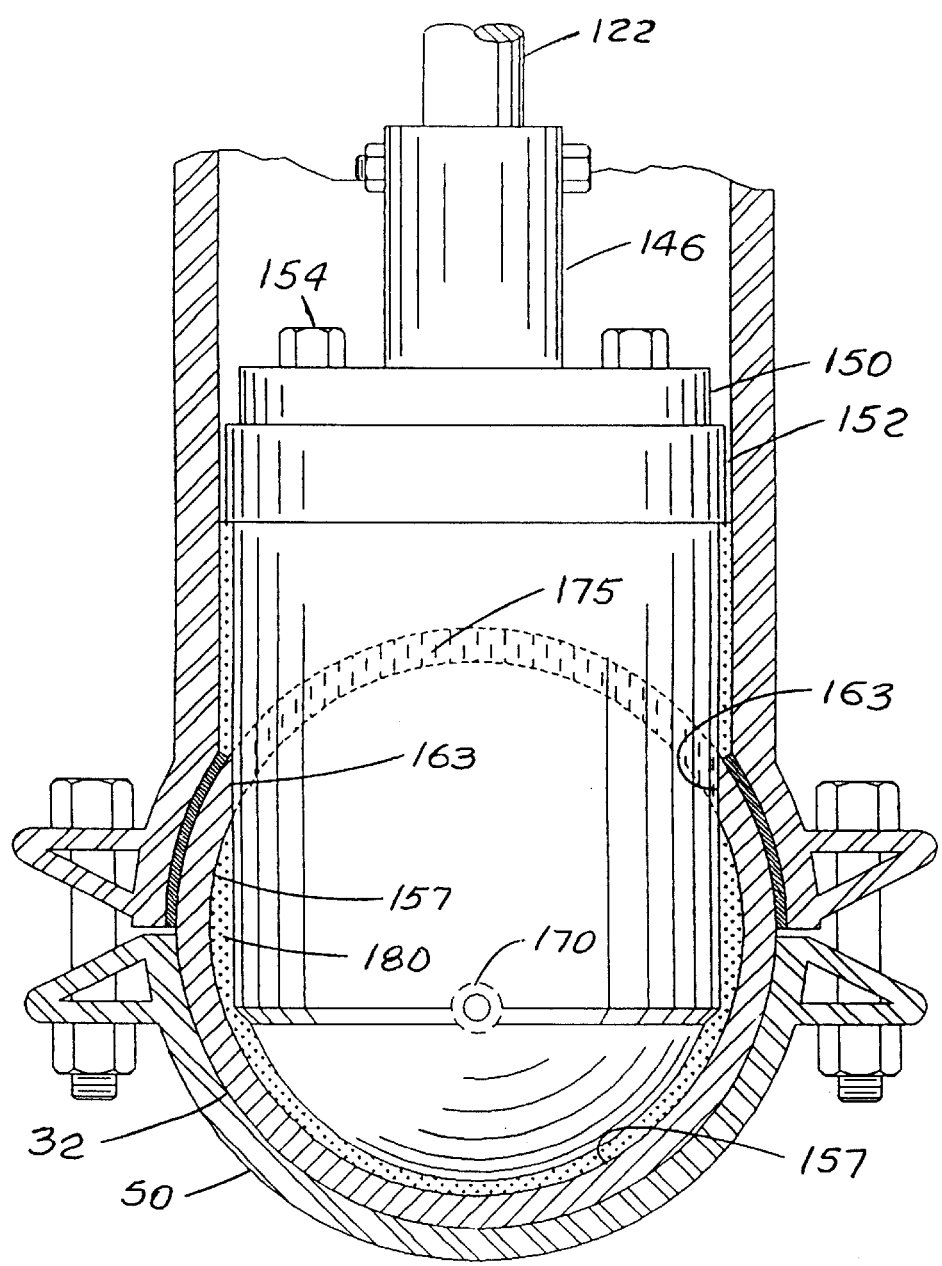
FIG. 14 is an enlarged cross-sectional view taken on Line 14—14 of FIG. 11 and being an enlargement of the temporary stopper positioned in sealing engagement with the conduit.

As shown in FIGS. 11, 12, 14, and 15, the downward force from carrier crown 152 deforms sealing element 180 laterally into sealing contact with inner wall 157 of the pipe upward through the side portions of cut surface 163. As shown in FIG. 13, the deformation of the sealing element creates lateral voids 179, 185, and 187 between the sealing element and retainer plugs 188, and the protective tube 195, respectively. Slit 173 and clearance aperture 169 are deformed relative to carrier fork bolt 170.

The present construction utilizes the resilient seal to engage the enlarged surface area of the cut at the lower portion of the cut in the pipe to effect a seal where the resilient sealing force applied by the fluid pressure in the pipe is reduced.

Figure 16:
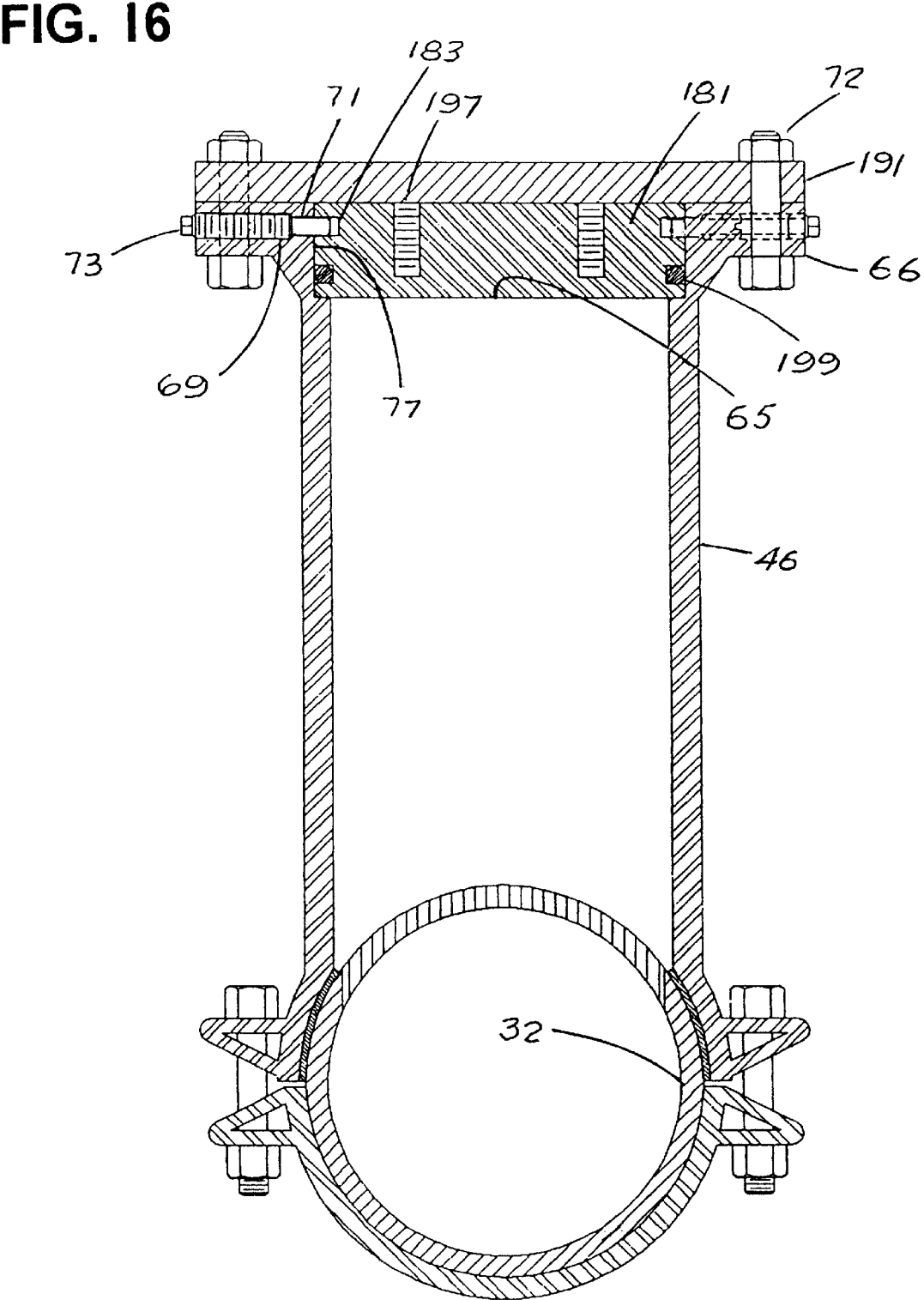
FIG. 16 is a cross-sectional view of a temporary stopper fitting with a completion plug and a closure flange.

The temporary conduit stopper is readily removed simply by turning the actuator screw counterclockwise to raise the stopper through nozzle 46 and valve 38 into the installation housing and actuator are removed from the valve. The stopper assembly 44 is removed from the plug holder flange 150 by removing two bolts 154. A completion plug 181, which is shown in FIG. 16, contains a pressure-sealing "O" ring 199. Plug 181 is installed onto holder flange 150 with bolts 154 that engage threaded receptacles 197 in the plug. The guide yoke set screws 142 are loosened, allowing rotation of the actuator rod 122 in the yoke aperture 140. The holder flange 150 is threadingly engaged with holder hub 147, which is still attached to the actuator rod 122.

The housing and actuator are reinstalled onto the valve, and the valve is then opened. The pipe plugs 73 are removed from the periphery of the nozzle flange 66, and the threaded lock screws 69 are retracted until the pin noses 71 are outward of the nozzle flange bore 77.

By turning the actuator handle clockwise, completion plug 181 is lowered into nozzle flange 66 until the bottom of the plug contacts the nozzle shoulder 65, which stops further downward movement. Lock screws 69 are then tightened into grooves 183 in completion plug 181, thereby vertically securing the plug in the nozzle flange against the upward force of the fluid pressure. A pressure seal between the inner wall of the nozzle flange and the completion plug is accomplished by the "O" ring 199.

A hand wrench is used to engage the wrench flats 130 on the actuator rod 122. The wrench is sharply tapped in a counterclockwise direction to loosen the threaded engagement between the plug holder flange stud 145 and hub 147. By turning the actuator rod 122 further counterclockwise, the holder hub and flange are separated.

Housing 40 and actuator are removed from the valve, and open valve 38 is removed from the nozzle flange 66. The holder flange 150 is unbolted from the top of the completion plug 181. A closure flange 191 with attached gasket is then mounted onto the nozzle flange with conventional bolts and nuts 72 to protect the installation. The temporary conduit stopper can later be reinstalled into the original fitting by reversing the sequence of operations.

Figure 17:
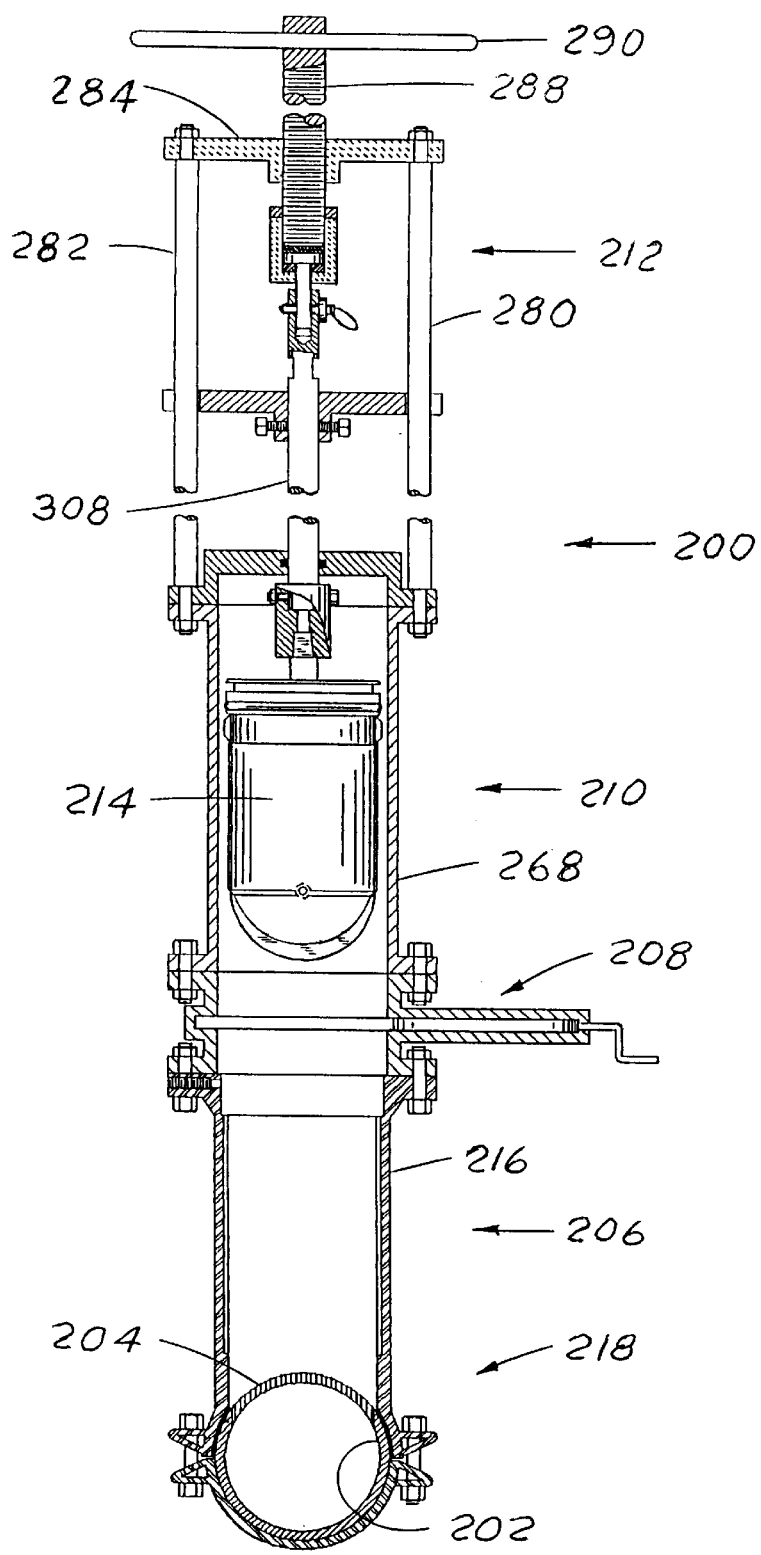
FIG. 17 is a cross-sectional elevational view similar to FIG. 1 but showing an installation apparatus with a permanent conduit stopper mounted in an installation housing mounted on a conduit.

A permanent conduit stopper is installed into a pressurized pipe using installation apparatus 200 shown in FIG. 17. This installation apparatus is shown mounted on a conventional conduit or pipe 202 with an aperture 204 formed therein. The pipe 202 with the aperture 204 is identical to pipe 32 with access port 34 described above. A nozzle assembly 206 is sealingly mounted on pipe 202. A temporary or tapping valve 208 is sealingly mounted on nozzle assembly 206. Valve 208 is identical in construction to valve 38 described above. An installation housing 210 is mounted on valve 208. An actuator assembly 212, which in this instance is a conventional jackscrew, is mounted on installation assembly 210. A permanent conduit stopper 214 is shown positioned in the installation housing 210.

Figure 20:
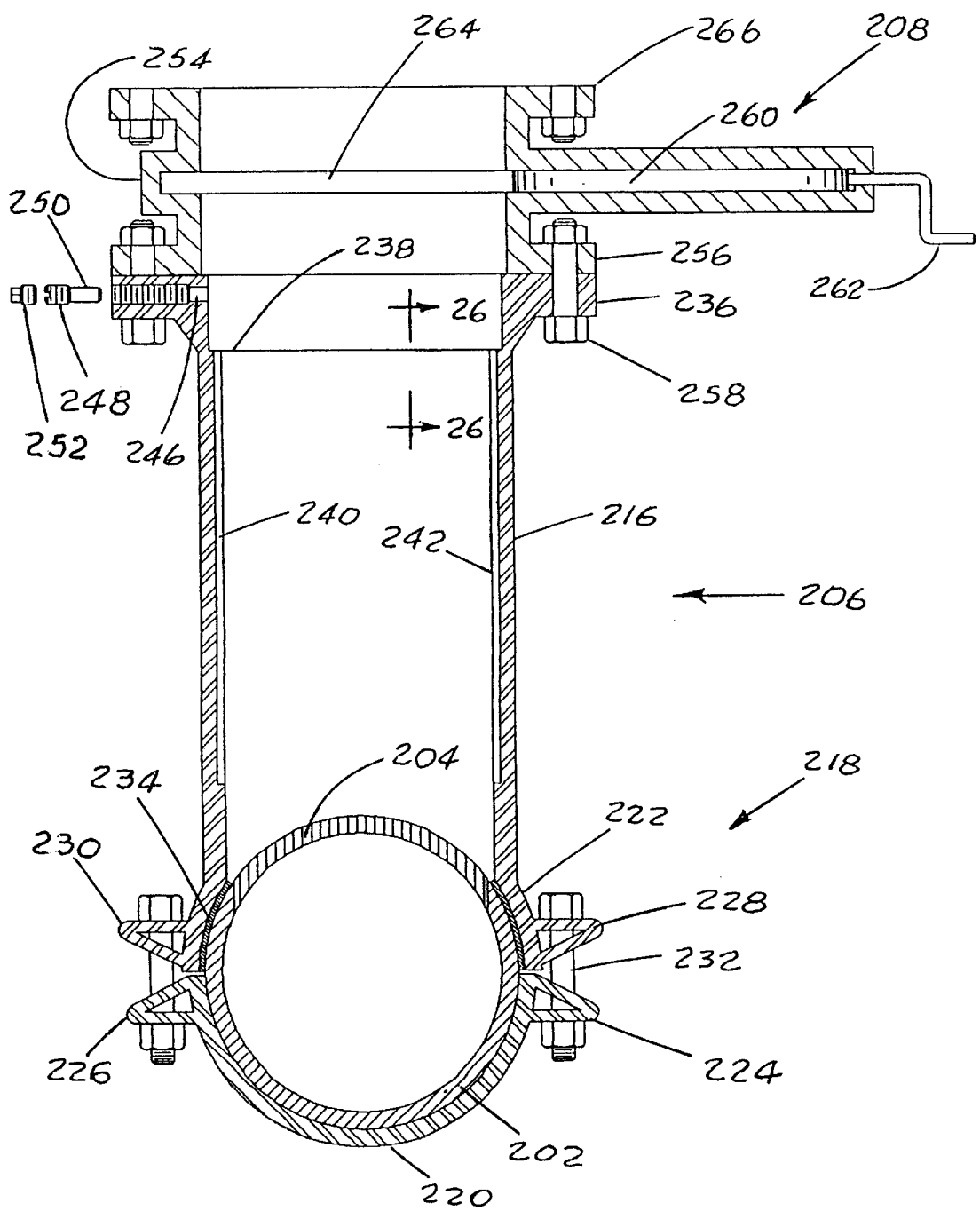
FIG. 20 is an enlarged fragmentary cross-sectional view of a flanged nozzle assembly shown in FIG. 17 mounted on the conduit.
Figure 26:
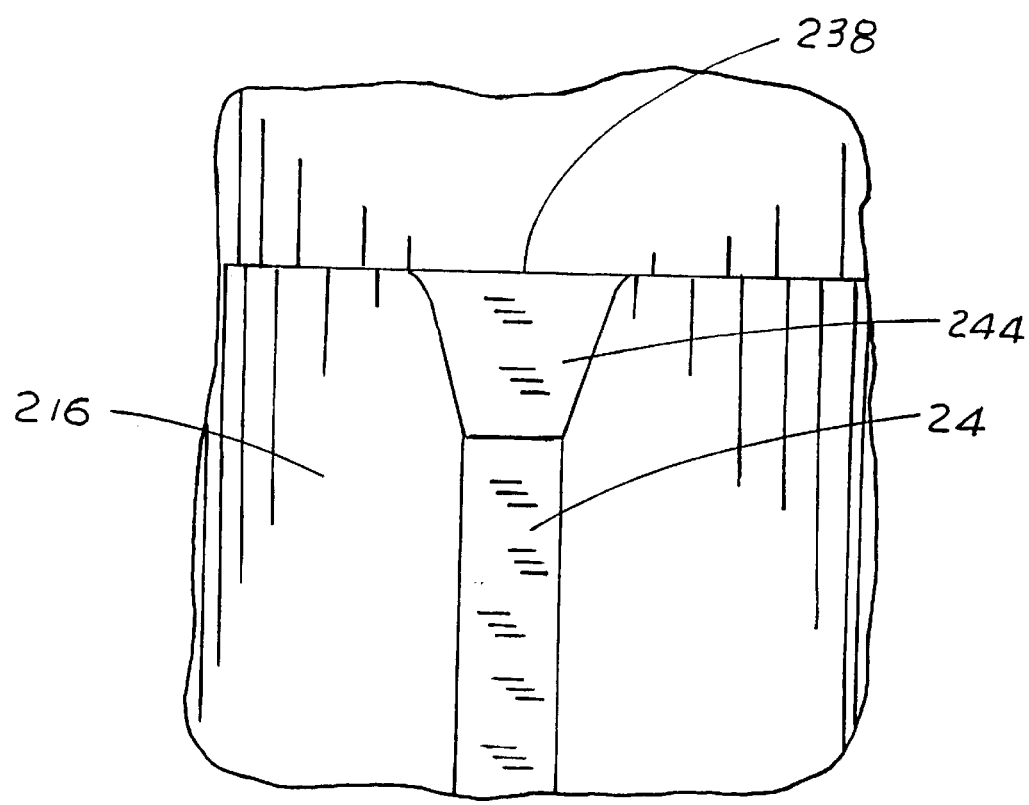
FIG. 26 is an enlarged fragmentary elevational view taken on Line 26—26 of FIG. 20, showing a keyway and a chamfer keyway entrance.
Figure 28:
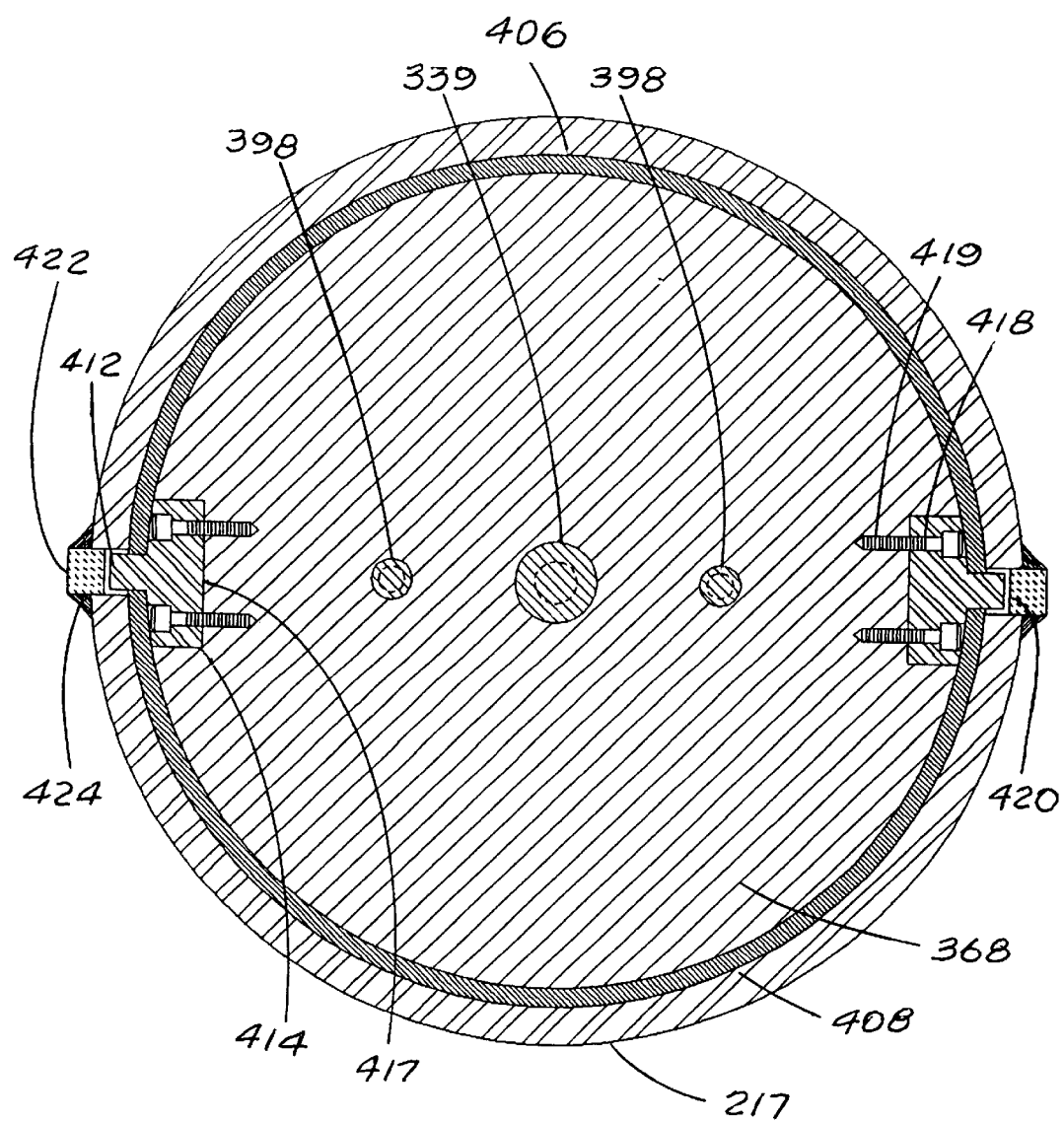
FIG. 28 is similar to FIG. 24, except showing an alternate construction for the keys and keyways.

Referring to FIG. 20, nozzle assembly 206 includes a nozzle 216, which is connected to a saddle assembly 218. The saddle assembly 218 is substantially identical in construction to saddle assembly 48 described hereinabove. Saddle assembly 218 includes a lower portion 220 and an upper portion 222. The lower portion has a pair of elongated ears 224 and 226. The upper portion includes a pair of elongated ears 228 and 230, which are positioned adjacent to ears 224 and 226, respectively. Conventional bolts and nuts 232 secure the upper and lower portions 222 and 220 to each other. A saddle gasket 234 is mounted on pipe 202 in contact with the upper portion 222 or the saddle. Gasket 234 surrounds aperture 204 to provide a leak proof seal around the aperture. Nozzle 216 is elongated and generally tubular and extends upward substantially perpendicular to a longitudinal axis of pipe 202. The nozzle has a nozzle flange 236 extending radially outward from the nozzle. Nozzle 216 includes an interior nozzle shoulder 238 adjacent to flange 236. Keyways 240 and 242 are shown machined into opposed sides of the interior wall of the nozzle, extending to the shoulder. An alternate construction is shown in FIG. 28. Each of the keyways has an enlarged chamfer opening 244, which is best seen in FIG. 26 for keyway 242. The chamfer facilitates the insertion of a key into the keyway.

Flange 236 has a plurality of radial lock screw threaded openings 246, which extend axially from the exterior of the flange to the interior of the nozzle. A completion plug lock screw 248 is threadedly mounted in each of openings 246. Each lock screw has a nose 250 formed therein. A pipe plug 252 is mounted on the outer end of each of the openings 246 to pressure seal the opening.

Figure 21:
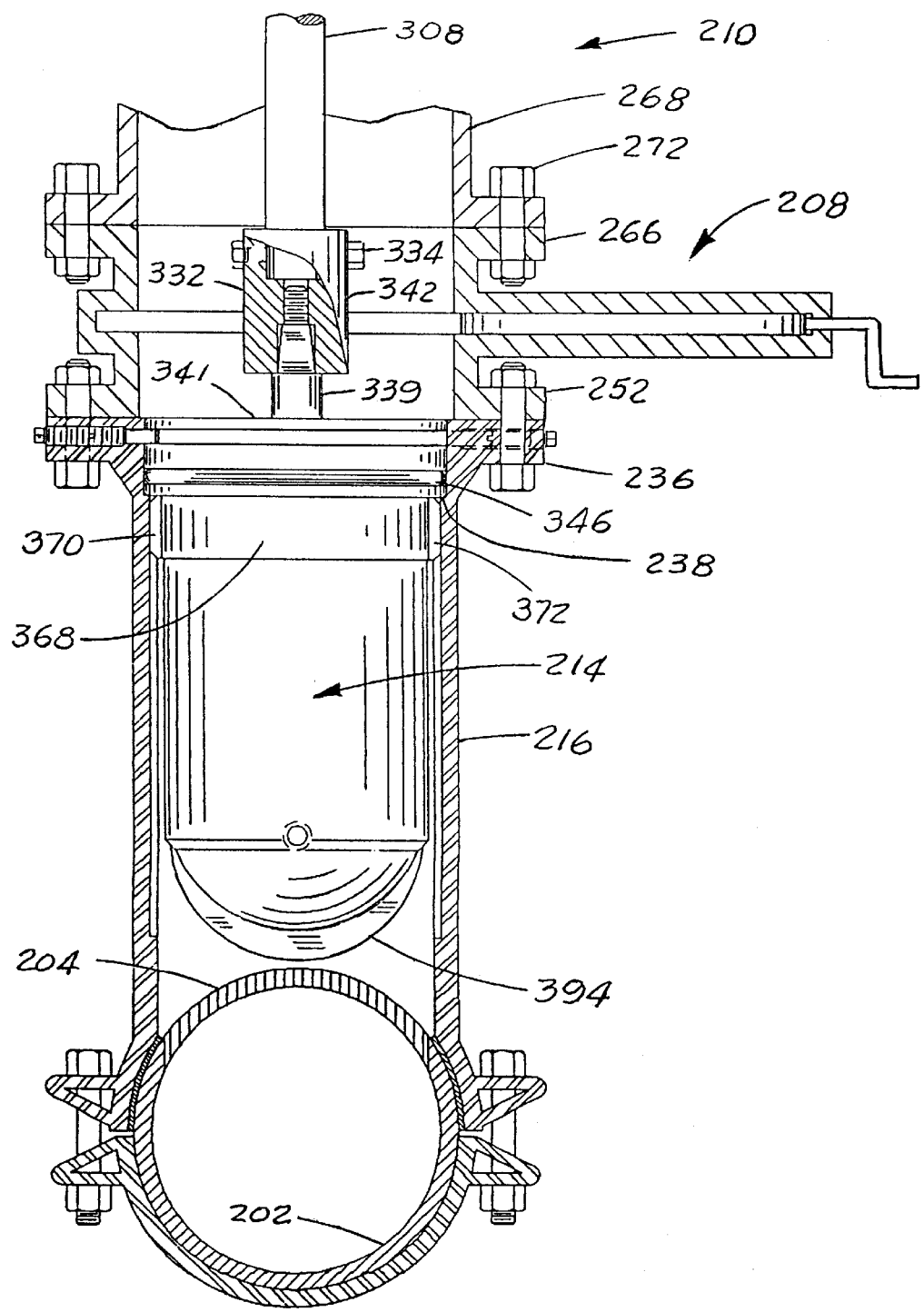
FIG. 21 is an enlarged fragmentary cross-sectional view similar to FIG. 20 but showing a permanent stopper sealingly secured in the flange of the nozzle assembly.
Figure 22:
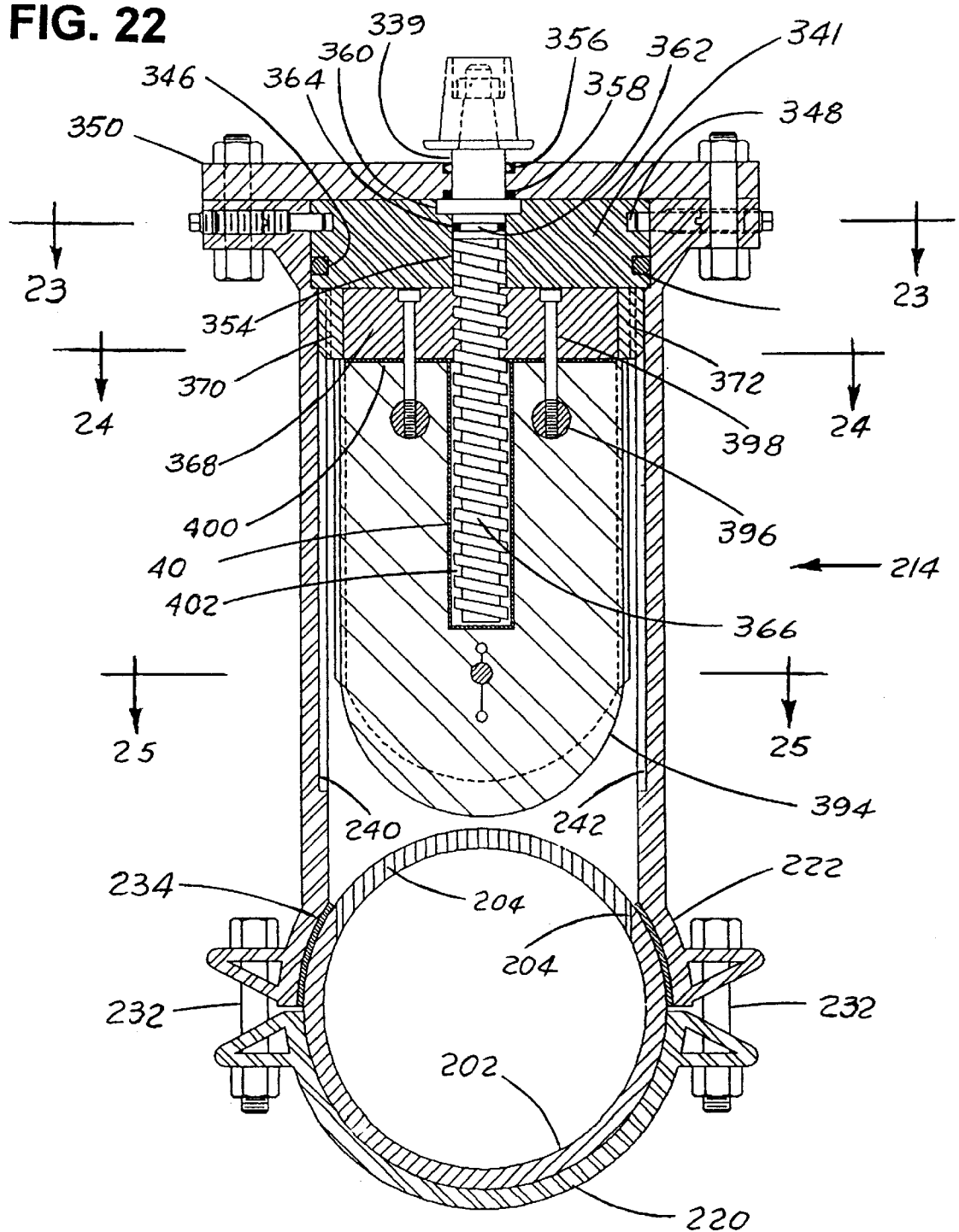
FIG. 22 is an enlarged fragmentary cross-sectional view showing a final assembly for the permanent conduit stopper with a plugging head in an open position.

Opening 204 is identical to access port 34, as also may be seen in FIGS. 21 and 22. The opening, as with port 34, has the least thickness of pipe exposed where the cut is made into the pipe at the top of the pipe. The greater thickness of pipe is exposed at the sides, closer to the center of the pipe. Thus, there is a gradation of the surface area of the pipe, increasing from the upper portion of the pipe to that side portion that is adjacent to the center of the pipe.

The temporary tapping valve 208 is identical in construction to valve 38. Valve 208 includes a valve body 254 having a flange 256 with gasket sealingly connected to nozzle flange 236 by a plurality of conventional nuts and bolts 258. Valve 208 includes a conventional gate 260, which is controlled by a crank valve 262. Gate 260 moves along a slot 264 into the valve body to control the flow of fluid through the valve. Valve body 254 has an upper flange 266 that is formed integral therewith to connect the valve to installation housing 210.

Figure 19:
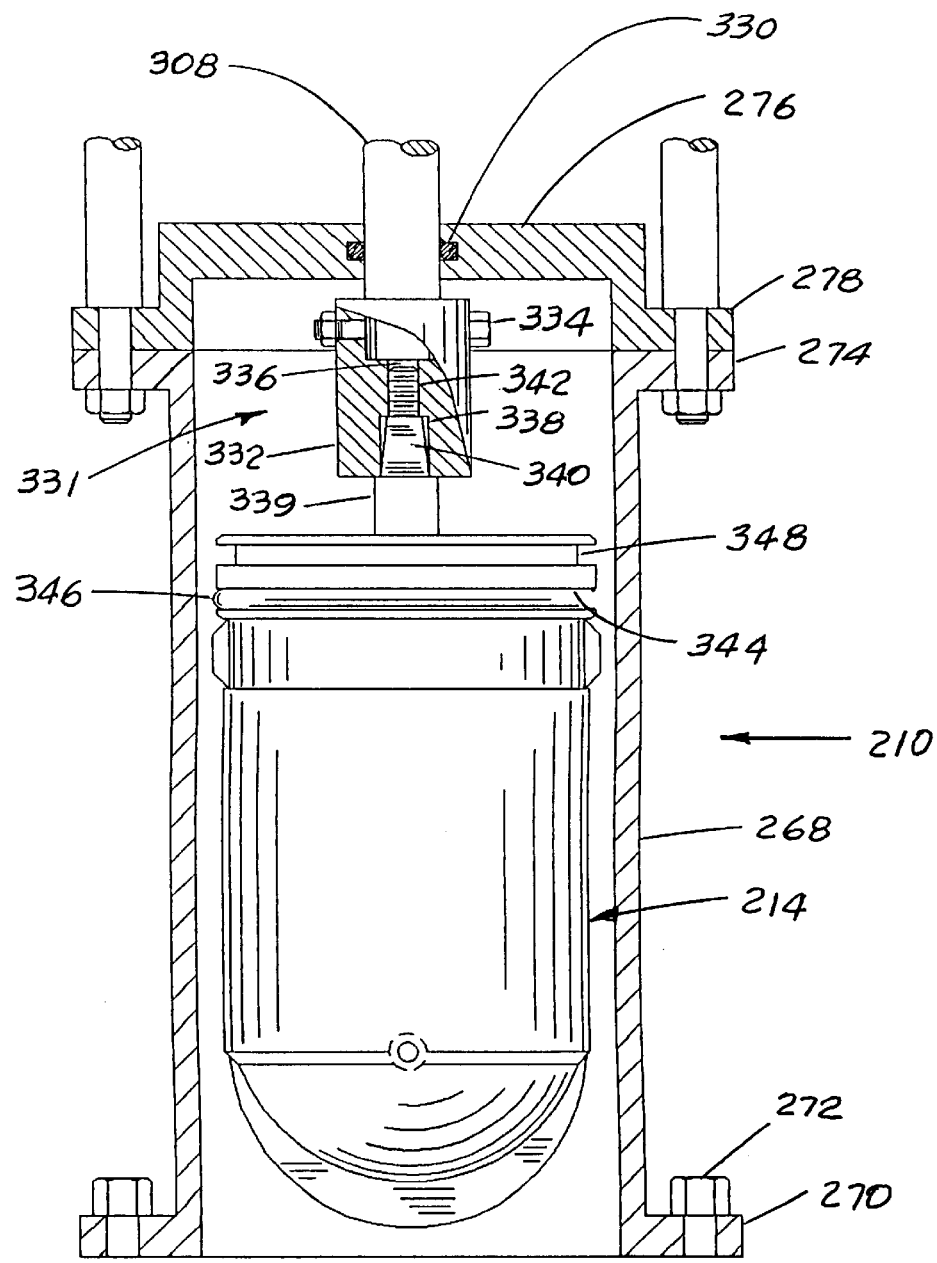
FIG. 19 is an enlarged partial cross-sectional view of an installation housing of the permanent stopper apparatus of FIG. 17 with a permanent conduit stopper positioned therein.

As shown in FIG. 19, installation housing 210 includes an elongated tubular housing 268 having a lower flange 270 formed integral therewith and sealingly secured to valve flange 266 by a plurality of conventional nuts and bolts 272. The installation housing has an upper flange 274 formed integral with its upper end. A flanged dome 276, identical to dome 90, is sealingly connected to the installation housing by an integral flange 278, which is connected to housing flange 274.

Figure 18:
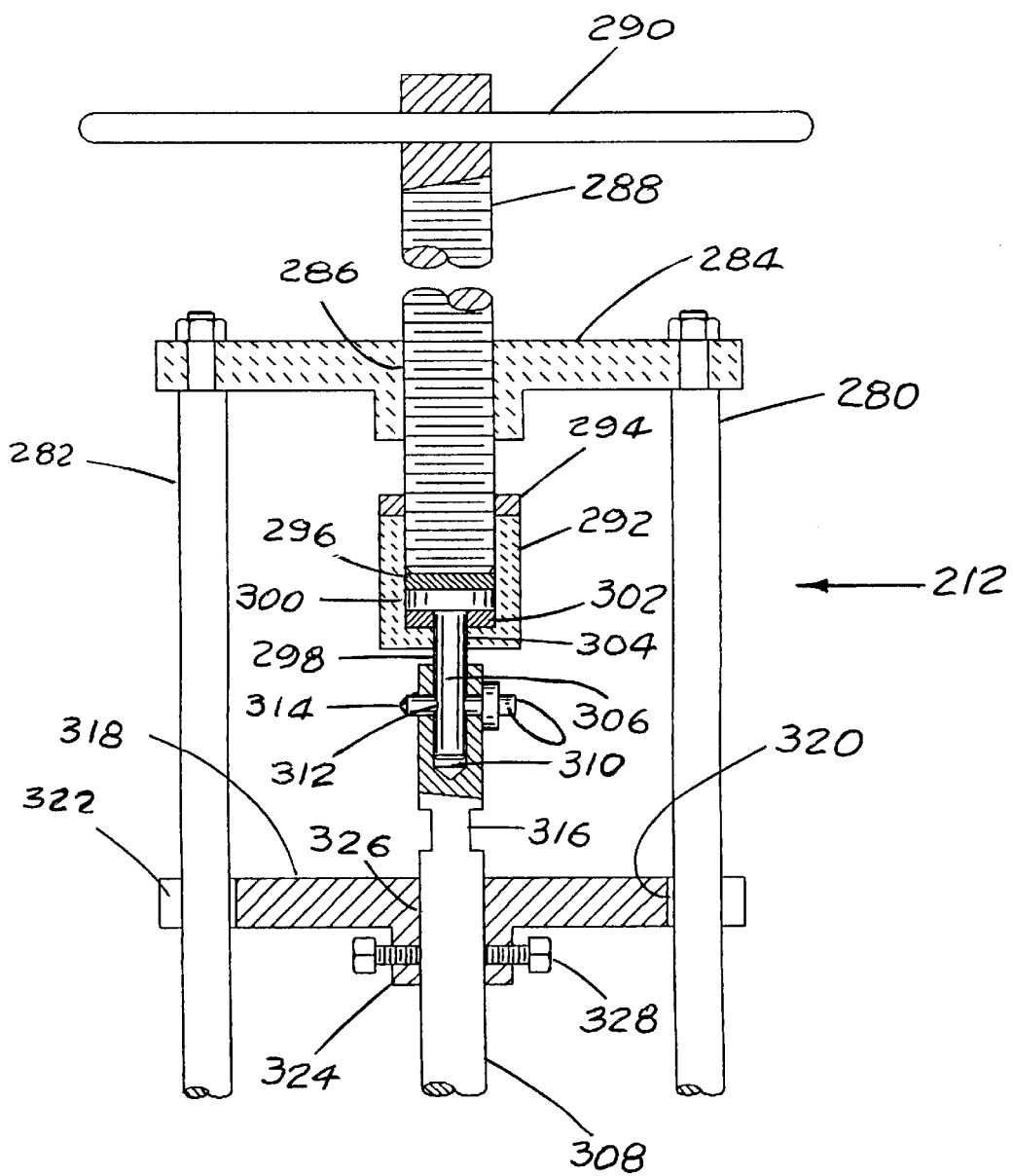
FIG. 18 is an enlarged fragmentary cross-sectional view of an actuator portion of the apparatus of Fib. 17.

As shown in FIG. 18, actuator 212 is identical in construction to actuator 42. Actuator 212 is connected to installation housing 210 by a pair of tie rods 280 and 282. Tie rods 280 and 282 serve to secure flanges 274 and 278. The upper ends of the tie rods are connected to each other by thrust plate 284. The thrust plate is identical in construction to thrust plate 98. Thrust plate 284 has an internally threaded aperture 286 that receives a conventional actuator screw 288 identical in construction to actuator screw 102. Actuator screw 288 has a tee handle 290 mounted in its upper end. The actuator screw has a threaded collar 292 mounted on its lower end, with a lock nut 294 locking the threaded collar to the actuator screw. A conventional thrust bearing 296 is mounted in collar 292 in engagement with the end of the actuator screw. A tee pin 298, identical to tee pin 112, has a head 300 in engagement with thrust bearing 296 and with a thrust washer 302. The collar 292 contains an aperture 304 through which extends a column 306 of tee pin 298. The threaded collar is free to rotate relative to tee pin 298. Column 306 of the tee pin is connected to an actuator rod 308. The actuator rod includes a column receptacle 310, which receives column 306 of the tee pin. The column includes a detent aperture 312, which receives a detente pin 314 to secure the tee pin to actuator rod 308. Actuator rod 308, like actuator rod 122, has a circular cross section, except for a pair of wrench flats 316 to provide a convenient means for rotating actuator rod 308 as needed.

A guide yoke 318, identical to guide yoke 132, is secured to the actuator rod 308. Guide yoke 318 includes a pair of tie rod slots 320 and 322, which receive tie rods 280 and 282, respectively. The yoke includes a guide yoke hub 324. A rod aperture 326 extends through the guide yoke hub and receives actuator rod 308. A plurality of set screws 328 is mounted in guide yoke hub 324 to secure the actuator rod 308 to guide yoke 318 and thereby prevent actuator rod 308 from rotating once the set screws are tightened. As shown in FIG. 19, actuator rod 308 extends through flanged dome 276, with a pressure seal 330 in engagement with the actuator rod. Permanent conduit stopper 214 is threadingly connected to actuator rod 308 by a plug holder assembly 331, which is identical to plug holder assembly 146. Plug holder hub 332 is secured to actuator rod 308 by a conventional nut and bolt 334. The bolt extends through hub 332 and through the rod 308 to non-rotatably secure the holder to the rod. Plugging head hub 332 includes an upper internally threaded opening 336 and a cylindrical lower receptacle portion 338.

Permanent conduit stopper 214 includes a valve stem 339 with a square pyramidal connector 340 formed integral with the stem and positioned in holder receptacle 338. A threaded stud 342 is formed integral with connector 340, which is threadedly mounted in threaded opening 336.

Permanent conduit stopper 214 includes a completion plug 341, which rotatably receives valve stem 339, as shown in FIG. 21. The completion plug, as may be seen in FIG. 19, includes a sealing groove 344, which has a conventional "O" ring 346 mounted therein to seal the plug to the nozzle. The completion plug also includes a locking groove 348. Referring to FIG. 22, completion plug 341 contains a valve stem aperture 354. A dirt seal 356 is mounted in the closure plate 350 in engagement with valve stem 339. A pressure seal 358 is also mounted in the closure plate.

Valve stem 339 includes an integral thrust collar 360 in engagement with the bottom of the closure plate. A stem sealing groove 362 is formed in the valve stem below collar 360, with a seal 364 mounted therein in engagement with the completion plug. The stem has a threaded portion 366 extending along the remainder of the length of the stem.

Figure 25:
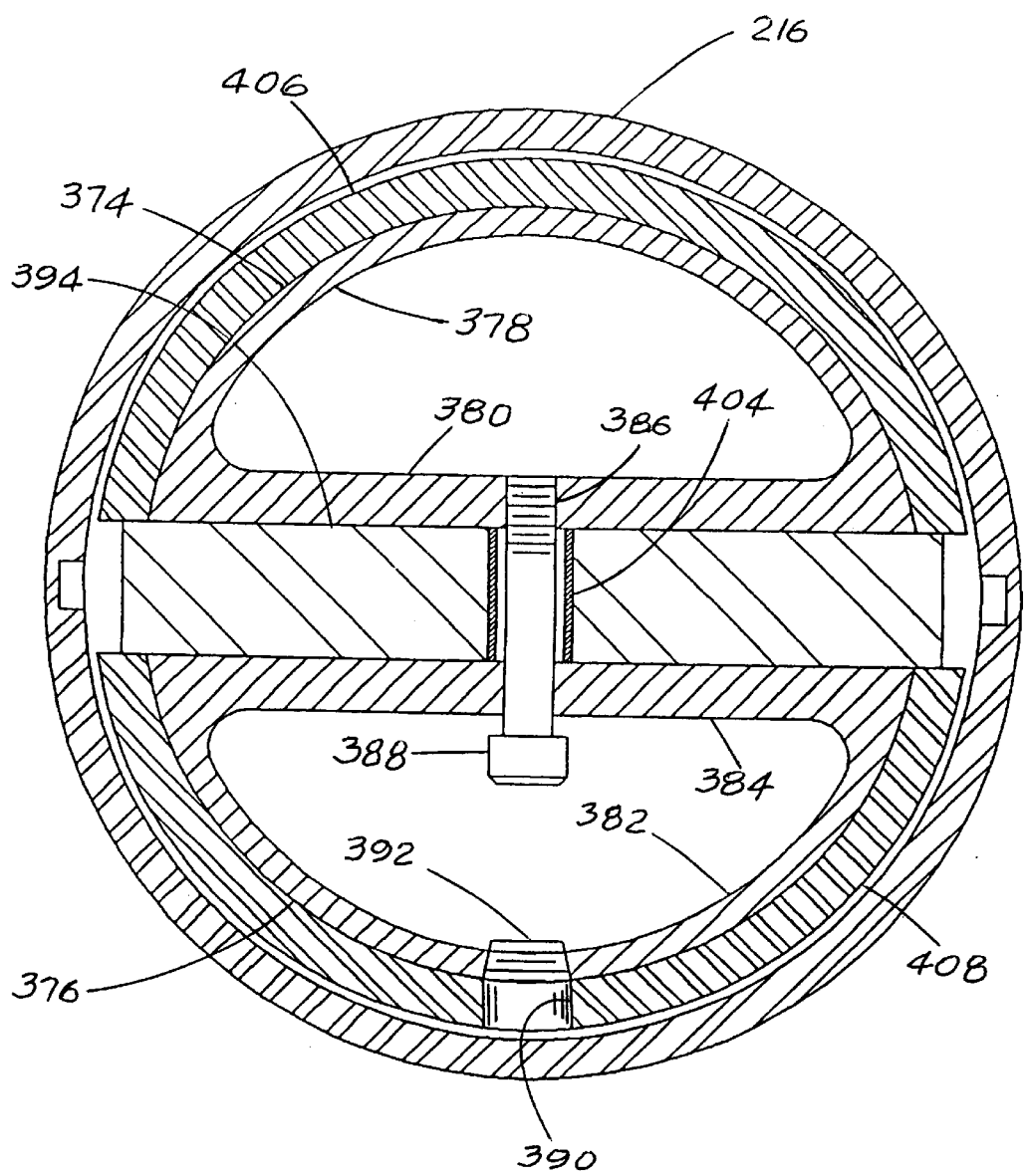
FIG. 25 is a cross-sectional view taken on Line 25—25 of FIG. 22, showing positioning of a relaxed deformable flat sealing element within a plugger carrier.

As shown in FIG. 25, a carrier has a crown 368 with a pair of arms or forks 374 and 376 attached thereto in the same manner that forks 156 and 158 are attached to crown 152. Fork 374 includes an outer web 378 and an inner web 380. Fork 376 includes an outer web 382 and an inner web 384. Inner web 380 includes an internally threaded receptacle 386, which receives a carrier fork bolt 388. Bolt 388 is rotatably mounted in inner web 384 and threadedly mounted in the threaded receptacle 386. Outer web 382 includes a plug aperture 390 to allow access to bolt 388. The aperture is closed by a removable sealing plug 392. Forks 374 and 376 terminate in generally hemispherical bottoms in the same manner as the termination of forks 156 and 158. A deformable sealing element or paddle 394 is mounted between forks 374 and 376.

Paddle 394, as may be seen in FIG. 22, has a pair of embedded threaded retainers 396 therein. Retainers 396 are connected to conventional bolts 398, which are mounted in crown 368. A shim 400 is selectively positioned between the crown and the paddle to allow space between the paddle and the crown to be adjusted. A vertical recess opening 402 in the paddle contains a rigid protective tube 403 to receive valve stem 339.

Referring to FIG. 25, a resilient sheet 406 is mounted on arm 374, and a resilient sheet 408 is mounted on fork 376. The resilient sheets 406 and 408 form a resilient seal and an effective slotted sleeve on the outer surface of forks 374 and 376. The space between the sheets, as may be seen in FIG. 25, is occupied by a portion of paddle 394. The paddle contains a rigid spacer collar 404, which surrounds fork bolt 388 and maintains minimum spacing between forks 374 and 376.

Referring to FIG. 22, as is conventional, the permanent stopper plug 214 is aligned inside the housing 214 so that the flat faces of the paddle 394 are perpendicular to the flow in the pipe. The plug assembly 214 is held in position by the guide yoke 318 cooperating with the tie rods 220 and 282. After mounting of the actuator 212 and housing 210 onto the valve 208, the actuator 212 moves plug 214 inside the tubular member 268, through the valve 208, and into the nozzle assembly 206. Referring to FIG. 26, keys 370 and 372 on crown 368 of the carrier enter into engagement with the chamfer portions 244 of the respective keyways so that the keys 370 and 372 move into their respective keyways 240 and 242, thus holding the paddle in an attitude perpendicular to the longitudinal axis of pipe 202.

Figure 23:
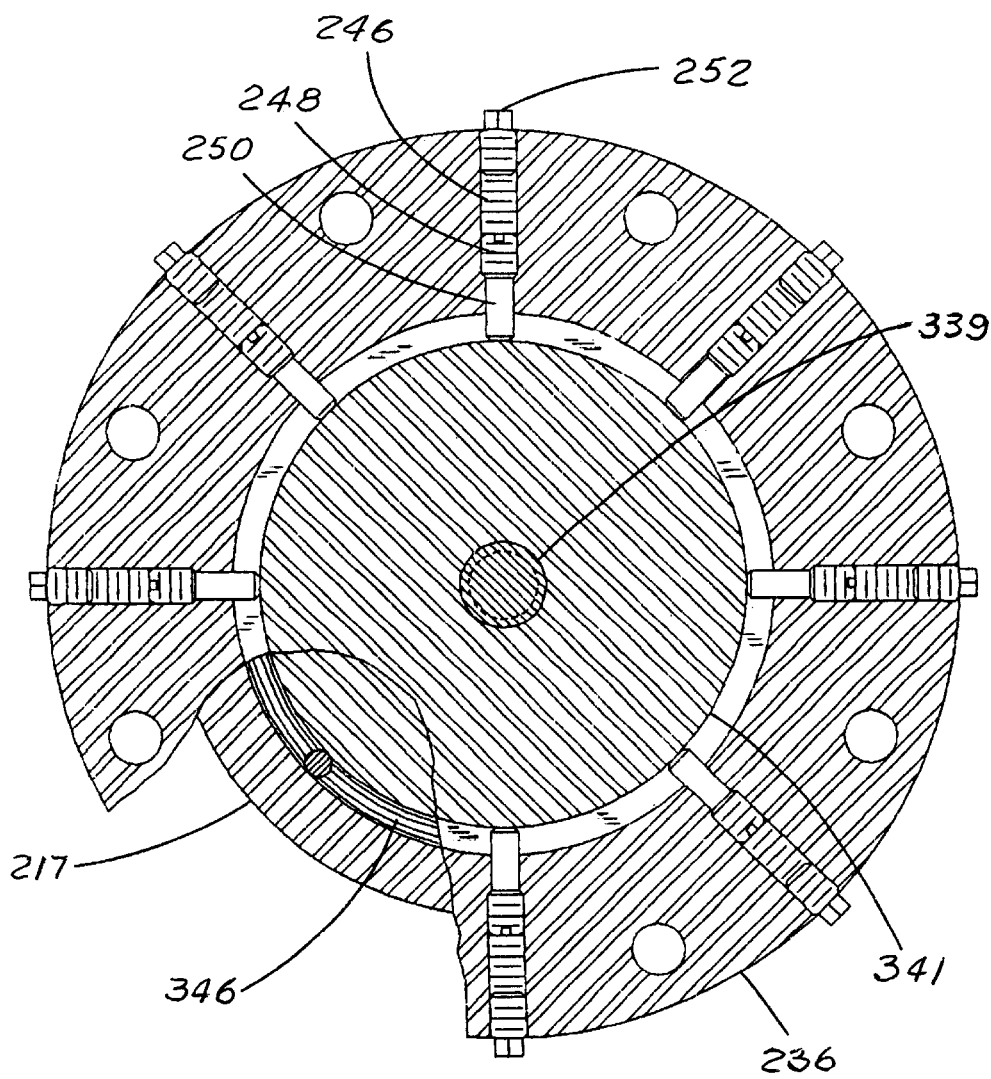
FIG. 23 is an enlarged fragmentary cross-sectional view taken on Line 23—23 of FIG. 22, showing a completion plug retained in position by lock screws and showing a portion of an "O" ring seal.
Figure 24:
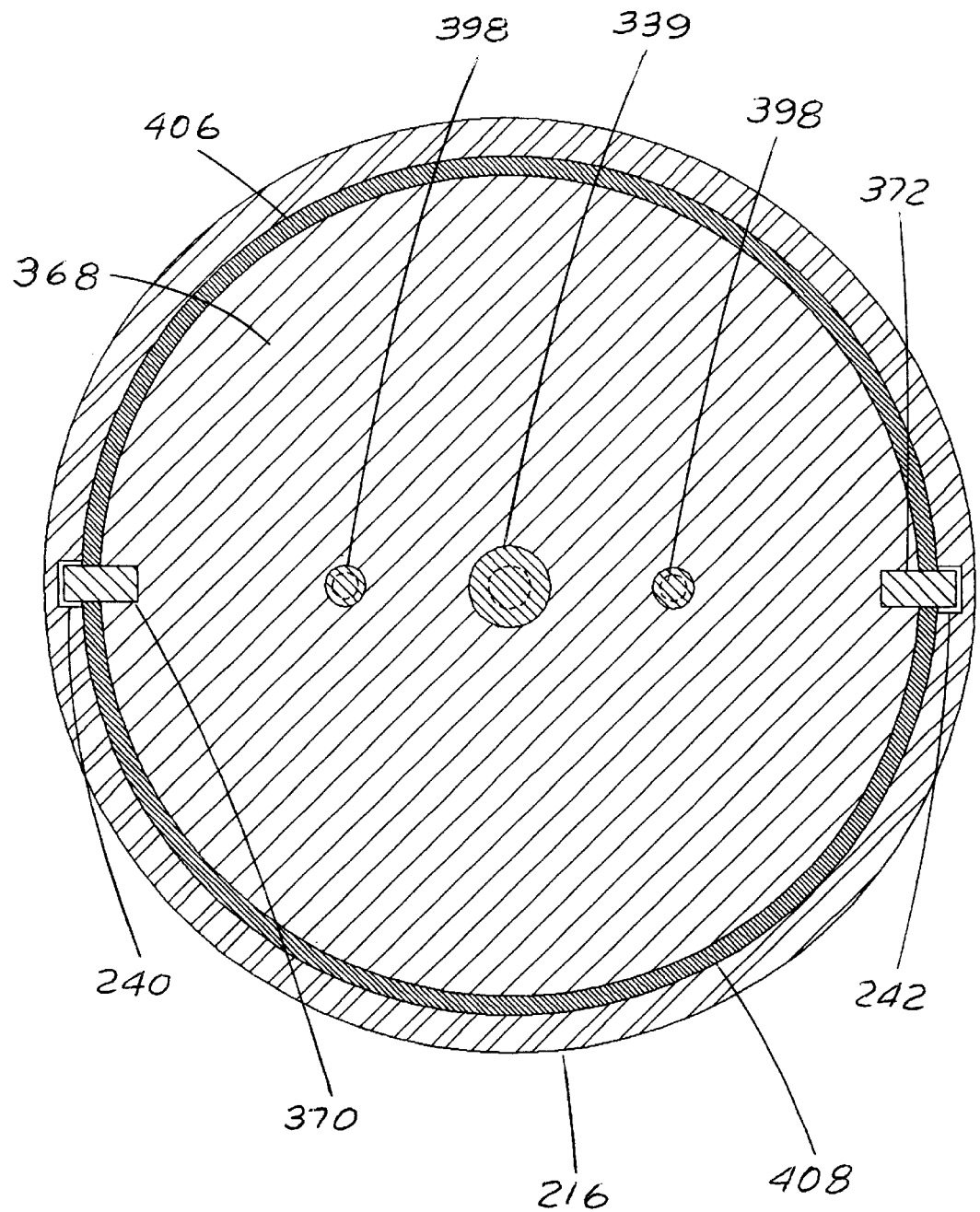
FIG. 24 is a cross-sectional view taken on Line 24—24 of FIG. 22, showing a carrier crown with opposed keys mounted in keyways in the nozzle.

As shown in FIG. 21, the plug then engages the nozzle shoulder 238, which prevents further movement of the entire plug into nozzle 216. Referring to FIG. 23, completion plug lock screws 248 are tightened so that the nose 250 of each of the screws extends into completion plug groove 348. In this instance, eight locking screws are utilized. However, an appropriate number of screws may be used, depending on the size of the nozzle and the pressure in the conduit. Once the lock screws 248 are in position, the holds are sealed by pipe plugs 252. The positioning of the completion plug "O" ring 346 in the nozzle seals off the nozzle so that tapping valve 208, along with installation housing 210 and actuator assembly 212, may be removed. A closure plate 350 with gasket is sealingly mounted to nozzle flange 236 and is secured in position by a plurality of conventional bolts and nuts 352.

Figure 27:
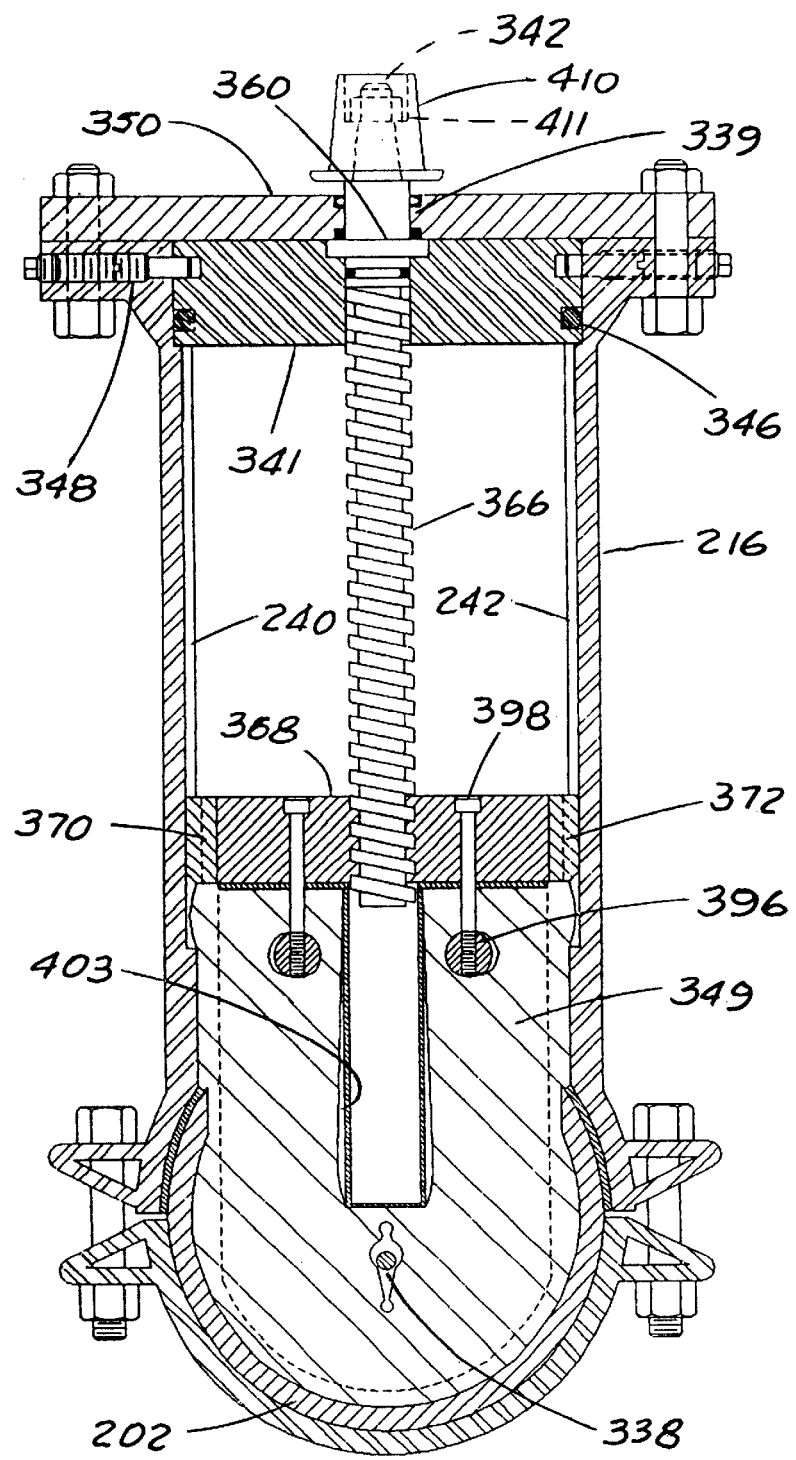
FIG. 27 is an enlarged cross-sectional view showing the permanent stopper in a closed attitude to seal flow through the conduit.

As shown in FIG. 27, the permanent stopper plug is used to interrupt flow of fluid through pipe 202. A wrenchhead 410 is mounted on the top of the valve stem extending through the plates 350 and secured to the stem with nut 411, which engages valve stem stud 342. The threaded portion 366 of the valve stem is threadedly engaged in the crown 368. Rotation of the valve stem causes the crown and associated parts to move downward toward the pipe. Continued movement of the crown with the paddle causes the paddle and the associated parts to enter opening 204 in pipe 202. As was described in detail above in connection with plug 44, the paddle engages the bottom of the pipe, and the downward force on the paddle causes the paddle to expand and push the forks outward so that the resilient sheets engage the cut portion of the pipe, as described above. In addition, the force applied by the pressure created by the fluid in the pipe provides an additional force on the sheet, which is downstream for further sealing engagement with the cut portion of the pipe. The cooperation of the resilient sheets and the paddle is described hereinabove to effect selective control of fluid to the conduit.

When it is desired to allow fluid to flow through the pipe, it is only necessary to rotate the valve stem to raise the crown and associated parts to open the pipe.

Referring to FIG. 28, an alternate key and keyway construction is shown. A pair of opposed keys 412 are integral with key blocks 414, which are generally rectangular in cross section. The blocks 414 are mounted in slots 417 formed into the entire depth of the exterior of the carrier crown 368. A plurality of screws 418 engage threaded receptacles 419 in the crown to secure the blocks thereto. A pair of opposed keyway openings 420 are formed through the side wall of the nozzle 216. The exteriors of the openings 420 are closed with a pair of elongated straps or plugs 422, which are pressure sealed to the nozzle with continuous welds 424. The instant construction operation in the same manner as keyway 240 and keys 370 and 372. However, the described alternative construction allows the keyway to be as deep as the wall thickness of nozzle 216.

From the foregoing, it may be seen that substantially the same parts may be utilized for a temporary plugging operation or installation of a permanent valve into a system. It is only necessary to provide a keyed plug and a modified closure plate and completion plug. The remaining parts are the same.

Economies of operation may be effected by utilization of the same parts.

Irrespective of whether the plug is used for temporary stop or as a permanent valve, the same basic construction of the sealing portion of the plug is utilized, wherein the paddle seals the lower portion of a pipe and a resilient sheet engages a substantial portion of the cut surface of the pipe to form an effective seal on the downstream side of the pipe.

Although specific embodiments of the herein disclosed invention have been described in detail above and shown in the accompanying drawings, it is readily apparent that those skilled in the art may make various modification and changes in the disclosed construction without departing from the spirit and scope of the invention. It is to be expressly understood that the instant invention is to be limited only by the appended claims.

What is claimed is:

1. In a conduit flow controller for selectively controlling the flow of a fluid through an elongated conduit including a continuous sidewall and having had a portion of the sidewall removed thereby forming an aperture, said aperture defined by a continuous peripheral edge of the sidewall of the conduit, the improvement comprising; an elongated housing sealingly connected to the conduit surrounding the aperture, a conduit stopper movably mounted in the housing and being positionable in the conduit through the aperture, said conduit stopper including; a deformable sealing element having a pair of substantially flat sides and a peripheral edge being adapted for sealing engagement with the interior of the conduit, a carrier sealingly connectable with the sealing element, said carrier having spaced forks receiving the sealing element between the forks, and a resilient seal mounted along a substantial portion of the entire length of the outer surface of each of said forks, said resilient seal engaging a portion of the continuous edge in cooperation with the sealing element to form a continuous seal with a portion of the continuous edge defining the aperture in the conduit, said element being cooperative with said resilient seal to close a portion of the elongated conduit adjacent to the aperture to prevent the flow of fluid along the elongated conduit past the sealing element and the resilient seal.

2. In a conduit flow controller for selectively controlling the flow of a fluid through an elongated conduit as defined in claim 1, said housing including a nozzle communication with the aperture, said nozzle movably receiving the carrier, said nozzle having a keyway along a portion of its length, and said carrier having a key slidably mounted in the keyway preventing the carrier from rotating within the nozzle.

3. In a conduit flow controller for selectively controlling the flow of a fluid through an elongated conduit as defined in claim 1, including, a completion plug mounted in the housing to seal an opening in the housing, and a stem connected to the carrier for selectively moving the carrier into the conduit to interrupt selectively fluid flow through the conduit.

4. In a conduit flow controller for selectively controlling the flow of a fluid through an elongated conduit as defined in claim 1, said housing including an elongated nozzle with an aperture end communicating with the aperture, a completion plug mounted in the nozzle at a plug end opposite to said aperture end, said carrier having a crown, and a stem threadedly mounted in the crown and extending through the completion plug, whereby selective rotation of the stem in one direction moves the carrier through the aperture into the conduit to interrupt flow of fluid through the conduit, and rotation of the stem in the opposite direction moves the carrier out of the conduit to allow fluid through the conduit.

5. In a conduit flow controller for selectively controlling the flow of a fluid through an elongated conduit as defined in claim 1, said housing including an elongated nozzle having one end communicating with the aperture, said nozzle having a keyway in a portion thereof, said nozzle movably receiving the carrier, said carrier having a key slidably mounted in the keyway preventing the carrier from rotating within the nozzle, a completion plug mounted in the housing to seal a plug end of the nozzle opposite said one end, and a stem connected to the carrier for selectively moving the carrier relative to the conduit to control selectively fluid flowing through the conduit.

6. In a conduit flow controller for selectively controlling the flow of a fluid through an elongated conduit as defined in claim 1, said housing including a nozzle communicating with the aperture, said nozzle having an elongated keyway in an interior portion thereof, said nozzle movably receiving the carrier, said carrier having a key slidably mounted in the keyway preventing the carrier from rotating within the nozzle, a completion plug mounted in the nozzle, said carrier having a crown, a stem threadedly mounted in the crown and extending through the completion plug, whereby selective rotation of the stem moves the carrier into the conduit to reduce the flow of fluid through the conduit, and rotation of the stem in the opposite direction moves the carrier away from the conduit to allow an increase in the flow of fluid through the conduit.

* * * * *